United States Patent
Lee et al.

(10) Patent No.: US 8,174,617 B2
(45) Date of Patent: May 8, 2012

(54) APPARATUS FOR PROVIDING MULTIPLE SCREENS AND METHOD OF DYNAMICALLY CONFIGURING MULTIPLE SCREENS

(75) Inventors: Jong-ho Lee, Seoul (KR); Kwang-kee Lee, Seoul (KR); Un-gyo Jung, Hwaseong-si (KR); Glenn A. Adams, Cambridge, MA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1253 days.

(21) Appl. No.: 11/496,396

(22) Filed: Aug. 1, 2006

(65) Prior Publication Data
US 2007/0030289 A1    Feb. 8, 2007

Related U.S. Application Data

(60) Provisional application No. 60/705,491, filed on Aug. 5, 2005, provisional application No. 60/789,577, filed on Apr. 6, 2006, provisional application No. 60/812,090, filed on Jun. 9, 2006.

(51) Int. Cl.
*H04N 5/45* (2006.01)
(52) U.S. Cl. ...................................................... 348/563
(58) Field of Classification Search .......... 348/563–569, 348/584, 588, 598, 725, 553, 571; 725/41, 725/43, 131, 37–39; 345/339, 340, 343
See application file for complete search history.

(56) References Cited

U.S. PATENT DOCUMENTS

| | | | |
|---|---|---|---|
| 4,829,294 A | 5/1989 | Iwami et al. | |
| 5,347,624 A * | 9/1994 | Takanashi et al. | 345/641 |
| 5,532,833 A | 7/1996 | Hong et al. | |
| 5,577,188 A | 11/1996 | Zhu | |
| 5,680,177 A * | 10/1997 | Abe | 348/564 |
| 5,847,771 A | 12/1998 | Cloutier et al. | |
| 5,889,517 A * | 3/1999 | Ueda et al. | 715/803 |
| 6,094,230 A * | 7/2000 | Han | 348/564 |
| 6,147,717 A * | 11/2000 | Jun | 348/588 |
| 6,295,646 B1 * | 9/2001 | Goldschmidt Iki et al. | 725/41 |
| 6,493,008 B1 * | 12/2002 | Yui | 715/840 |
| 2001/0040584 A1 | 11/2001 | Deleeuw | |
| 2002/0049975 A1 | 4/2002 | Thomas et al. | |
| 2004/0095401 A1 * | 5/2004 | Tomimori | 345/864 |
| 2005/0149879 A1 * | 7/2005 | Jobs et al. | 715/796 |

(Continued)

FOREIGN PATENT DOCUMENTS

JP    11-212534 A    8/1999

(Continued)

OTHER PUBLICATIONS

Communication issued by European Patent Office on Jun. 7, 2010 in counterpart European Application No. 06823626.4.

(Continued)

*Primary Examiner* — Paulos Natnael
(74) *Attorney, Agent, or Firm* — Sughrue Mion, PLLC

(57) ABSTRACT

An apparatus for providing multiple screens and a method of dynamically configuring the multiple screens are provided. The apparatus for providing multiple screens retrieves the type of the screens in the device and connection relationship therebetween in order to dynamically configure multiple screens that provide a plurality of services on a physical display device. The apparatus for providing multiple screens includes an operation module generating at least one of screens for displaying a received service, and a retrieval module retrieving a screen on which an application included in the service is executed among the screens.

33 Claims, 25 Drawing Sheets

U.S. PATENT DOCUMENTS

2005/0162557 A1* 7/2005 Choi .............................. 348/565

FOREIGN PATENT DOCUMENTS

| KR | 1998-048945 A | 9/1998 |
|---|---|---|
| KR | 2002-0078256 A | 10/2002 |
| WO | WO 01/04868 A1 | 1/2001 |
| WO | WO 03/077540 A1 | 9/2003 |
| WO | WO 2004/047433 A1 | 6/2004 |

OTHER PUBLICATIONS

Morris, S., et al., "Interactive TV Standards: A Guide to MHP, OCAP, and Java TV", 2005, pp. 89-98, 118-178, ch. 5, 7, Focal Press, Elsevier.

* cited by examiner

ABSTRACT SERVICE

NON-ABSTRACT SERVICE

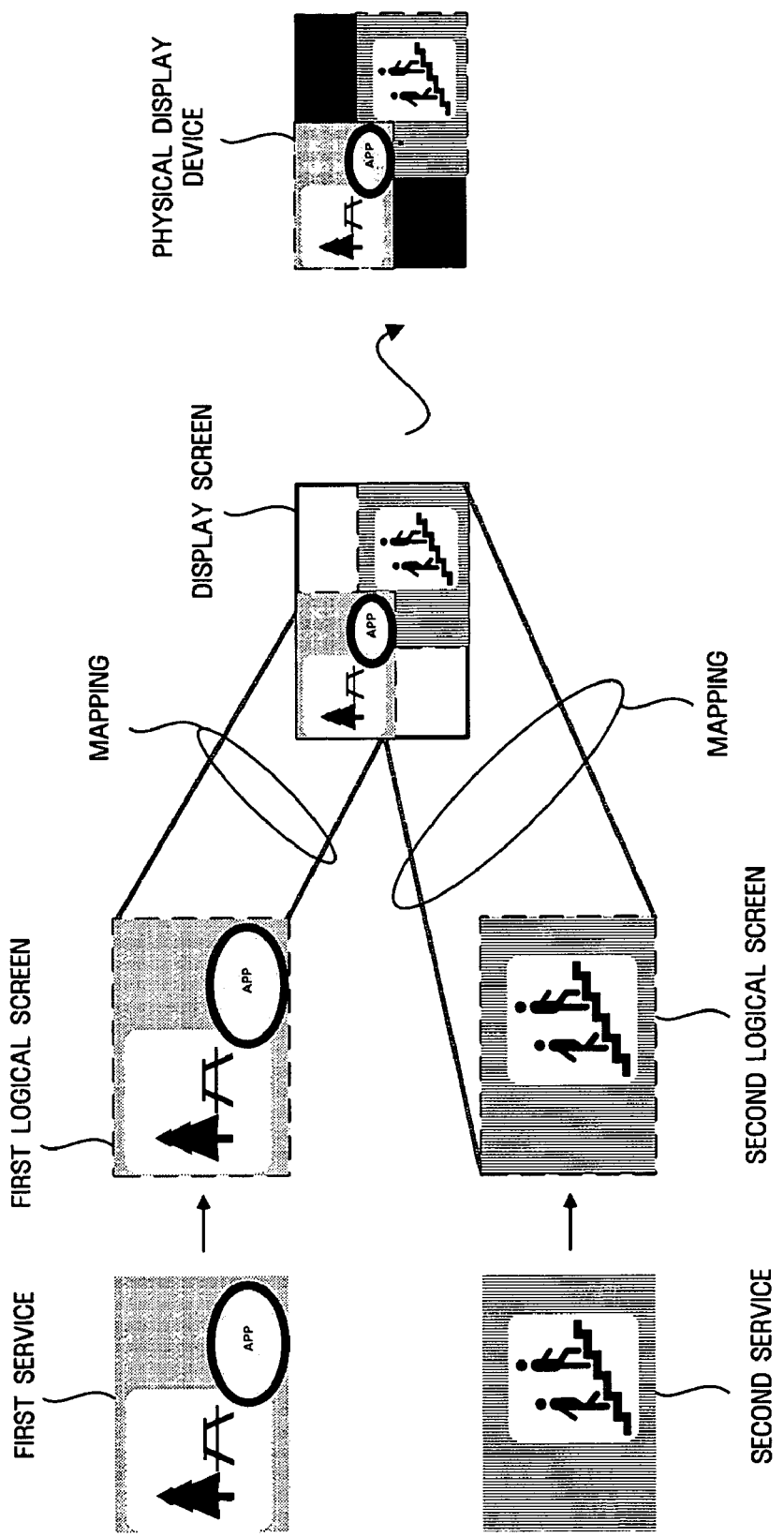

FIG. 16A

```
HScreen screen = HScreen.getDefaultHScreen();

MultiScreenConfiguration screenConf =
    MultiScreenManager.getInstance().getScreenConfiguration();

int conf = screenConf.getScreenConfigurationType();

switch (conf) {
    case MultiScreenConfiguration.SCREEN_CONFIGURATION_PIP:
    case MultiScreenConfiguration.SCREEN_CONFIGURATION_PIP_WITH_OVERLAY:
        break;
    case MultiScreenConfiguration.SCREEN_CONFIGURATION_POP:
    case MultiScreenConfiguration.SCREEN_CONFIGURATION_POP_WITH_OVERLAY:
        break;
    default:
        break;
}
```

FIG. 16B

```
MultiScreenManager msm = MultiScreenManager.getInstance();
HScreen[] screens = msm.getScreens();

for(int i = 0; i < screens.length; i++) {
    int screenType = ((MultiScreenContext)screens[i]).getScreenType();
}
```

FIG. 16C

```
HScreen screen = HScreen.getDefaultHScreen();

HScreen dispScreen = null;

if(screen instanceof MultiScreenContext) {
    MultiScreenContext msc = (MultiScreenContext) screen;

if(msc.getScreenType() == MultiScreenContext.SCREEN_TYPE_LOGICAL) {
        dispScreen = msc.getDisplayScreen();
    }
    else {
        dispScreen = screen;
    }
}
```

FIG. 16D

```
if(screen instanceof MultiScreenContext) {
    if(((MultiScreenContext)screen).getScreenType() == SCREEN_TYPE_LOGICAL)) {
        // screen is type of SCREEN_TYPE_LOGICAL.
    }
    else {
        // screen is type of SCREEN_TYPE_DISPLAY.
    }
}
```

FIG. 16E

```
if(screen instanceof MultiScreenContext) &&
(((MultiScreenContext)screen).getScreenType() == SCREEN_TYPE_LOGICAL)) {
    MultiScreenContext msc = (MultiScreenContext) screen;
    HScreenRectangle rect = msc.getDisplayArea();
}
```

FIG. 16F

```
if(screen instanceof MultiScreenContext) &&
(((MultiScreenContext)screen).getScreenType() == SCREEN_TYPE_LOGICAL)) {
    MultiScreenContext msc = (MultiScreenContext) screen;
    Service Context[] contexts = msc.getContexts();
}
```

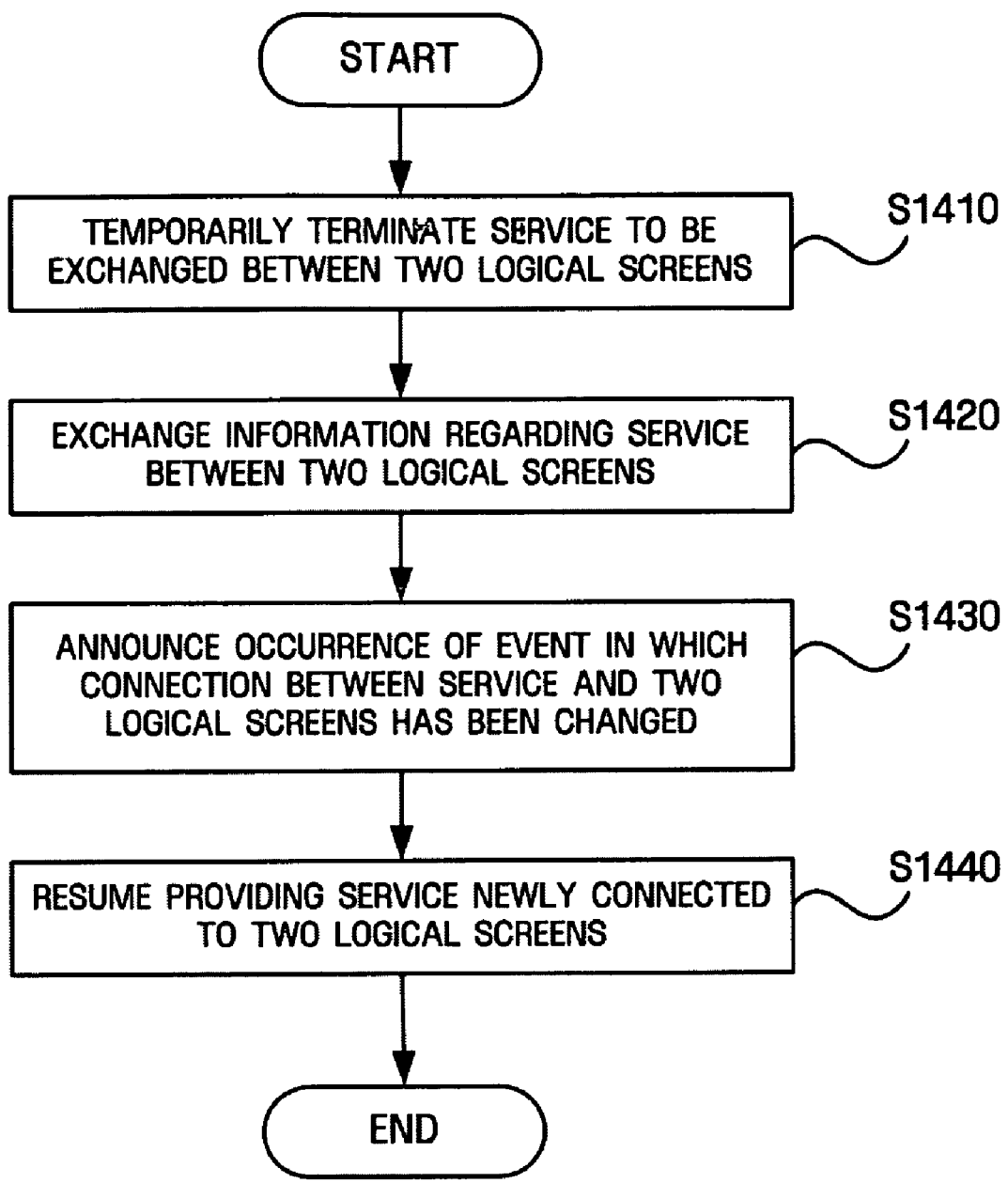

APPARATUS FOR PROVIDING MULTIPLE SCREENS AND METHOD OF DYNAMICALLY CONFIGURING MULTIPLE SCREENS

CROSS-REFERENCES TO RELATED APPLICATIONS

This application claims priority from U.S. Provisional Patent Application Nos. 60/705,491, 60/789,577 and 60/812,090 filed on Aug. 5, 2005, Apr. 6, 2006 and Jun. 9, 2006, respectively, in the United States Patent and Trademark Office, the disclosures of which are incorporated herein by reference in their entirety.

BACKGROUND OF THE INVENTION

1. Field of the Invention

Apparatuses and methods consistent with the present invention relate to providing multiple screens and dynamically configuring the multiple screens, and more particularly, to retrieving a type of the screens and connection relationship therebetween in order to dynamically configure multiple screens that provide a plurality of services on a physical display device.

2. Description of the Related Art

Related art broadcast receivers such as digital televisions (TVs) or digital set-top boxes provide only one content element on a single physical display device or simultaneously display a main screen and a sub-screen on a single physical display device.

Even though related art broadcast receivers can simultaneously display both the main screen and the sub-screen on the same display screen, they can only arrange the main screen and the sub-screen in a limited number of manners. In the case of a content displayed within the main screen, all elements of the content, i.e., video data, audio data, and other data, are displayed. On the other hand, in the case of a content displayed within the sub-screen, only some of the elements of the content are displayed.

Content sources include a broadcast service such as a satellite broadcaster, a terrestrial broadcaster, or a cable broadcaster, a storage medium such as digital versatile discs (DVDs), or an external device connected to an input terminal. However, it is quite difficult to display contents provided by such various content sources on a display screen using the existing broadcast receivers.

In an interactive TV application program environment such as the Multimedia Home Platform (MHP), the Advanced Common Application (ACAP), and the Open Cable Application Platform (OCAP), it is assumed that only one screen is output on a physical display device.

In the interactive TV application program environment, for example, a Home Audio/Video Interoperability (HAVi)-based user interface (UI) is adopted. According to the HAVi UI standard, even though no restriction is imposed on the number of screens displayed on a physical display device, only one screen is generally displayed on a physical display device.

In such an environment, it is difficult to perform operations, such as decoding, digital signal processing, user interaction processing, etc. with respect to one among multimedia contents displayed on a screen while displaying the multimedia contents on independent screens. In addition, it is also difficult to dynamically control the life cycles of application programs and the use of resources in the units of the screens.

Accordingly, there exists a need for a method of displaying a variety of contents on a dynamically configured screen.

SUMMARY OF THE INVENTION

The present invention apparatus and method for providing multiple screens, wherein a type of screens in a system and connection relationship therebetween is retrieved in order to dynamically configure multiple screens that display a plurality of services on a physical display device.

According to an aspect of the present invention, there is provided an apparatus for providing multiple screens, the apparatus including an operation module generating at least one of screens for displaying a received service, and a retrieval module retrieving a screen on which a predetermined application included in the service is executed among the screens.

According to another aspect of the present invention, there is provided an apparatus for providing multiple screens, the apparatus including an operation module generating logical screens for displaying a received service and a display screen to which the logical screens are mapped, and a retrieval module retrieving all of the logical screens and the display screen generated by the operation module.

According to still another aspect of the present invention, there is provided an apparatus for providing multiple screens, the apparatus including an operation module generating logical screens for displaying a received service and a display screen to which the logical screens are mapped, and a retrieval module retrieving the logical screens and the display screen.

According to still another aspect of the present invention, there is provided an apparatus for providing multiple screens, the apparatus including a broadcast signal receiving module receiving a service, an operation module generating logical screens and a display screen to which the logical screens are mapped, and a retrieval module retrieving whether a screen displaying the service is the logical screen or the display screen.

According to a further aspect of the present invention, there is provided a method of dynamically configuring multiple screens, the method including generating at least one of screens for displaying a received service and retrieving a screen on which a predetermined application included in the service is executed among the screens.

According to yet another aspect of the present invention, there is provided a method of dynamically configuring multiple screens, the method including generating logical screens for displaying a received service, generating a display screen to which the logical screens are mapped, and retrieving all of the generated logical screens and the display screen.

According to yet another aspect of the present invention, there is provided a method of dynamically configuring multiple screens, the method including generating logical screens for displaying a received service, generating a display screen to which the logical screens are mapped, and retrieving the logical screens and the display screen.

According to yet another aspect of the present invention, there is provided a method of dynamically configuring multiple screens including receiving a service, generating logical screens, generating a display screen to which the logical screens are mapped, and retrieving whether a screen displaying the service is the logical screen or the display screen.

BRIEF DESCRIPTION OF THE DRAWINGS

The above and other aspects of the present invention will become more apparent by describing in detail exemplary embodiments thereof with reference to the attached drawings, in which:

FIG. 9 is a diagram illustrating a method of mapping two services to a display screen according to an exemplary embodiment of the present invention;

FIGS. 16A to 16F are diagrams illustrating codes for retrieving screens according to an exemplary embodiment of the present invention; and FIG. 17 is a flowchart illustrating a process of exchanging services displayed on the logical screens by individual modules shown in FIG. 13 according to an exemplary embodiment of the present invention.

DETAILED DESCRIPTION OF EXEMPLARY EMBODIMENTS OF THE INVENTION

Figure 1A:
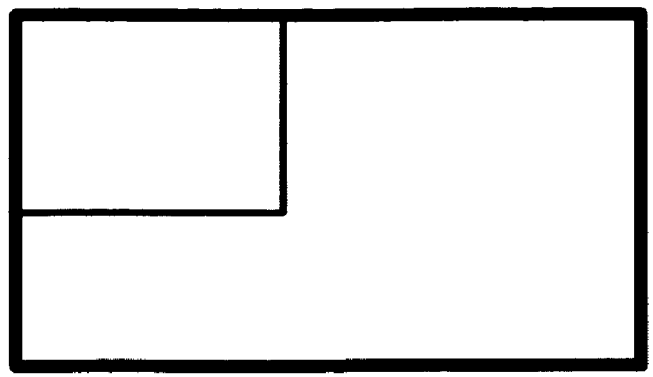
FIGS. 1A to 1H are diagrams illustrating configurations of a PiP screen according to exemplary embodiments of the present invention.
Figure 1B:
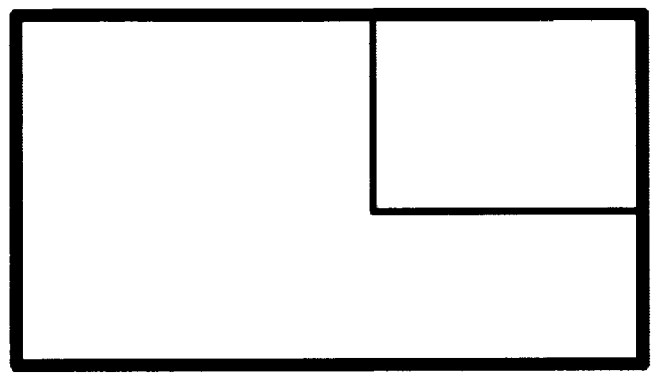
Figure 1C:
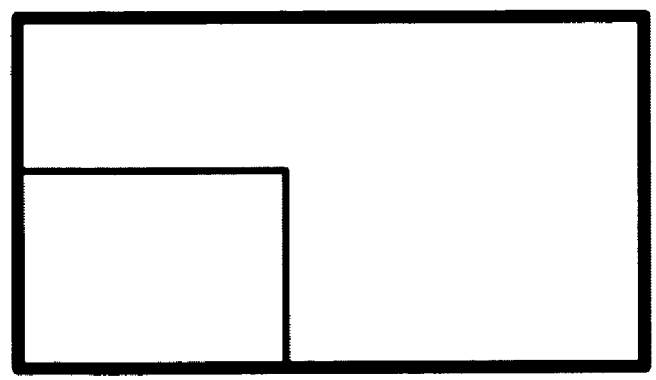
Figure 1D:
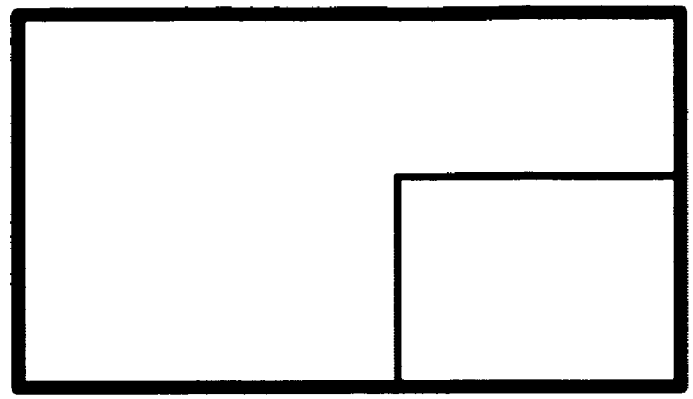

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to generate a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory generate an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to generate a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

For a better understanding of the present invention, the terms used in this disclosure will now be defined.

The term 'service' indicates a group of multimedia contents displayed together, i.e., a group of service components.

Service components are elements of a service and include a video component, an audio component, and a data component. A data component is an application in a service.

Further, the applications are classified into an unbound application and a service bound application. Since the unbound application has a high priority, the resource is smoothly allocated. A monitor application corresponds to a specific unbound application that has the highest priority.

The service bound application is associated to a transport stream, and allows a lower priority than that of the unbound application. The service bound application does not function as a critical system. When a competition for resources occurs, the service bound application has a larger possibility of abandoning the resource allocation than the unbound application. The service bound application includes a conjunction type that operates in conjunction with a stream that is being transported and a non-conjunction type that operates independently from the stream.

The term 'service context' indicates an object which can control the executing of a service and includes various resources, devices, and execution state information needed for providing a service.

The term 'physical display device' indicates a physical space which actually displays the content of a service.

The term 'display screen' indicates a screen actually displayed on a physical display device. An arbitrary service may be directly set in the display screen, and the display screen may be displayed on a physical display device. Alternatively, at least one logical screen which is mapped to a certain area of the display screen may be displayed on the physical display device.

The term 'logical screen' indicates a space in which an arbitrary service is displayed. A logical screen is a virtual screen before being mapped to a display screen and thus is not displayed on a physical display device.

The logical screen and the display screen may be a combination of a background still image, a video raster, and a graphic raster. The graphic raster may be a combination of text, lines, colors, and images or a mixture of video frames.

The term 'main service' indicates a service that is selected as a main service through a menu displayed on the physical display device or a remote controller by a user or through an API by an application, and the screen on which the main service is displayed is referred to as a 'main screen'.

The term 'Picture-in-Picture service' (PiP service) indicates a service that is selected as a sub-service in the main service through a menu displayed on a physical display device or a remote controller by a user via an API by an application, and the PiP service may be displayed on a picture-in-picture screen (PiP screen) or a main screen.

Figure 1E:
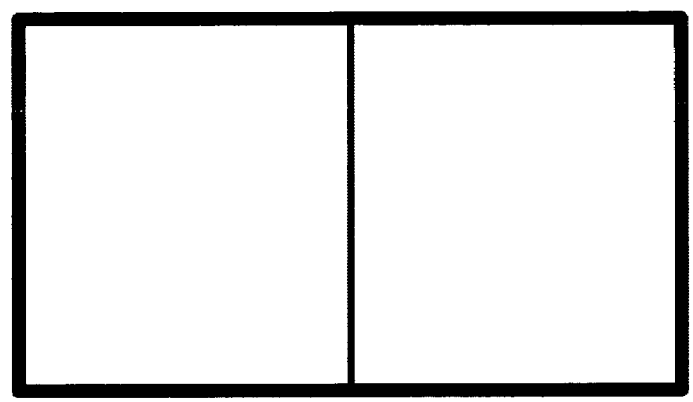
Figure 1F:
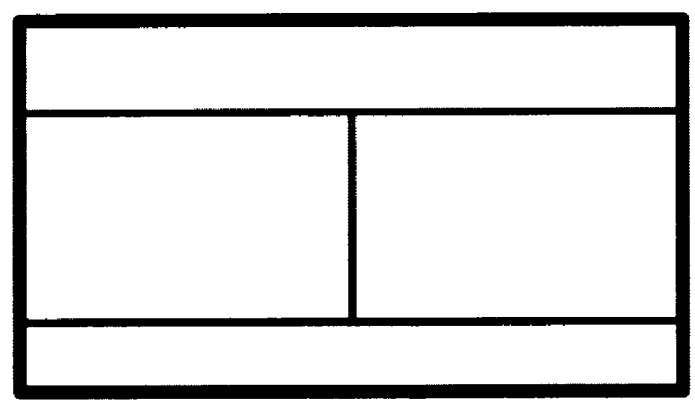
Figure 1G:
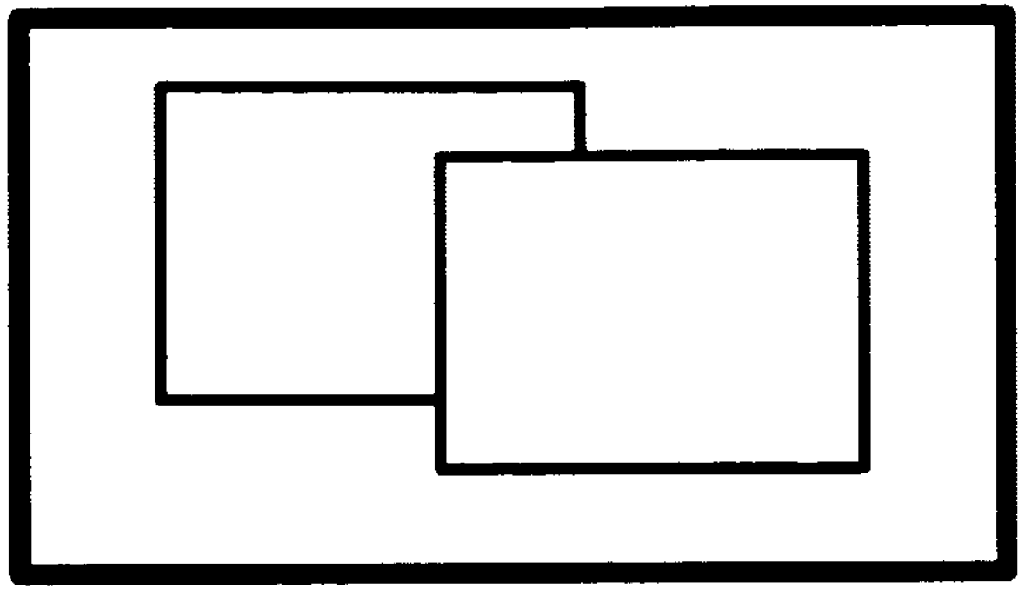
Figure 1H:
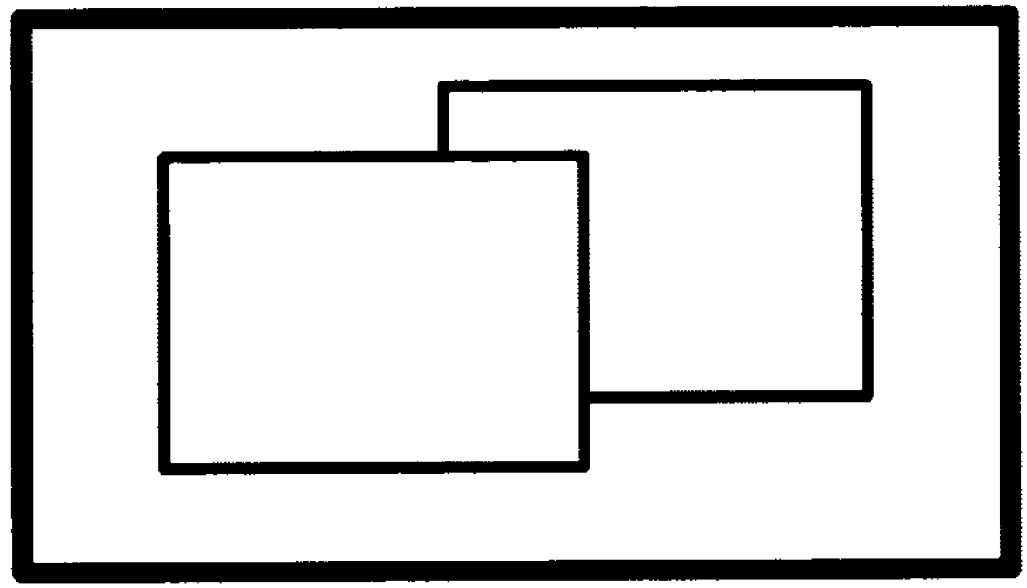

The PiP screen includes a screen that occupies a part of another screen as illustrated in FIGS. 1A to 1D and a screen that is simultaneously displayed with another screen without overlapping the other screen as illustrated in FIGS. 1E to 1F. In this case, it is understood that the PiP screen may include a screen that is displayed on an arbitrary location or area in the physical display device or overlaps another screen, as illustrated in FIGS. 1G and 1H.

Figure 2:
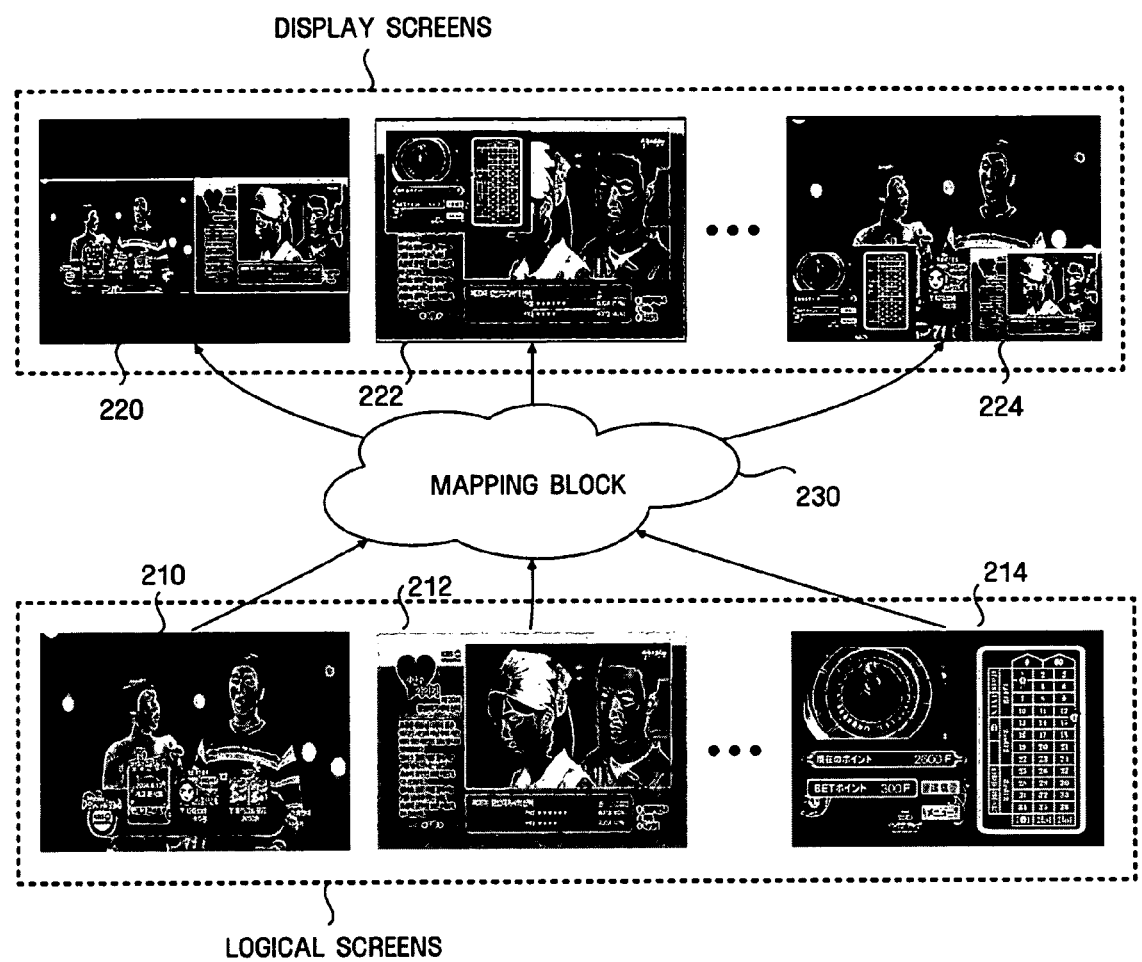
FIG. 2 is a diagram illustrating the relationship between a logical screen and a display screen according to an exemplary embodiment of the present invention.

FIG. 2 is a diagram illustrating the relationship between a logical screen and a display screen according to an exemplary embodiment of the present invention.

Referring to FIG. 2, a service may be displayed using logical screens 210, 212, and 214. The logical screens 210, 212, and 214 are mapped to display screens 220, 222, and 224 through a mapping block 230.

In detail, the logical screens 210 and 212 are mapped to the display screen 220, the logical screens 212 and 214 are mapped to the display screen 222, and the logical screens 210, 212, and 214 are mapped to the display screen 224.

In short, at least one logical screen which displays a service is mapped to an arbitrary area of a display screen.

The mapping block 230 is a group of various pieces of information needed for mapping a logical screen to a display screen. Examples of the various pieces of information include coordinate information of a predetermined area on a display screen to which each of a plurality of logical screens is mapped, identification information of the logical screens and the display screen, and information specifying in what order the logical screens are displayed on the display screen.

The mapping block 230 can change the size of the logical screen so to be allocated in an arbitrary area of the display screen. That is, the mapping block 230 can perform scaling of the logical screen and allocating of the position thereof, and FIGS. 3A to 3E are diagrams illustrating a configuration of the screen including a mapper as the mapping block.

Figure 3A:
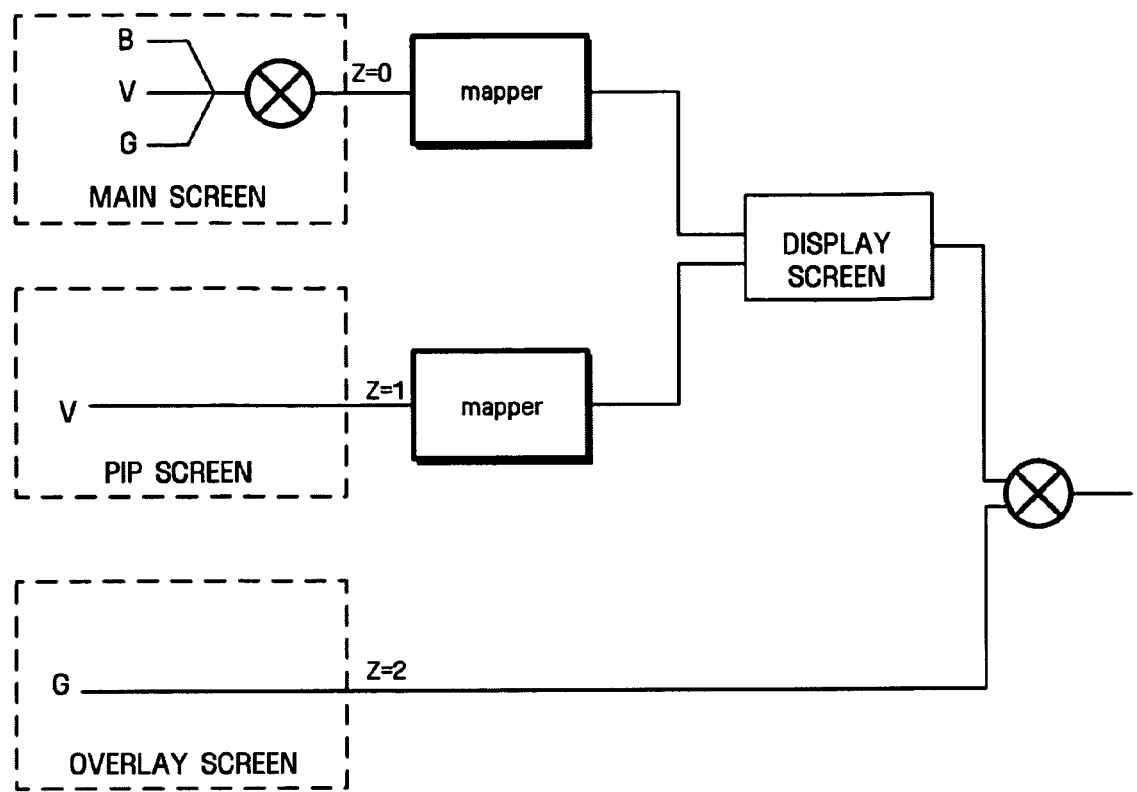
FIGS. 3A to 3E are diagrams illustrating a configuration of a screen including a mapper according to an exemplary embodiment of the present invention.
Figure 3B:
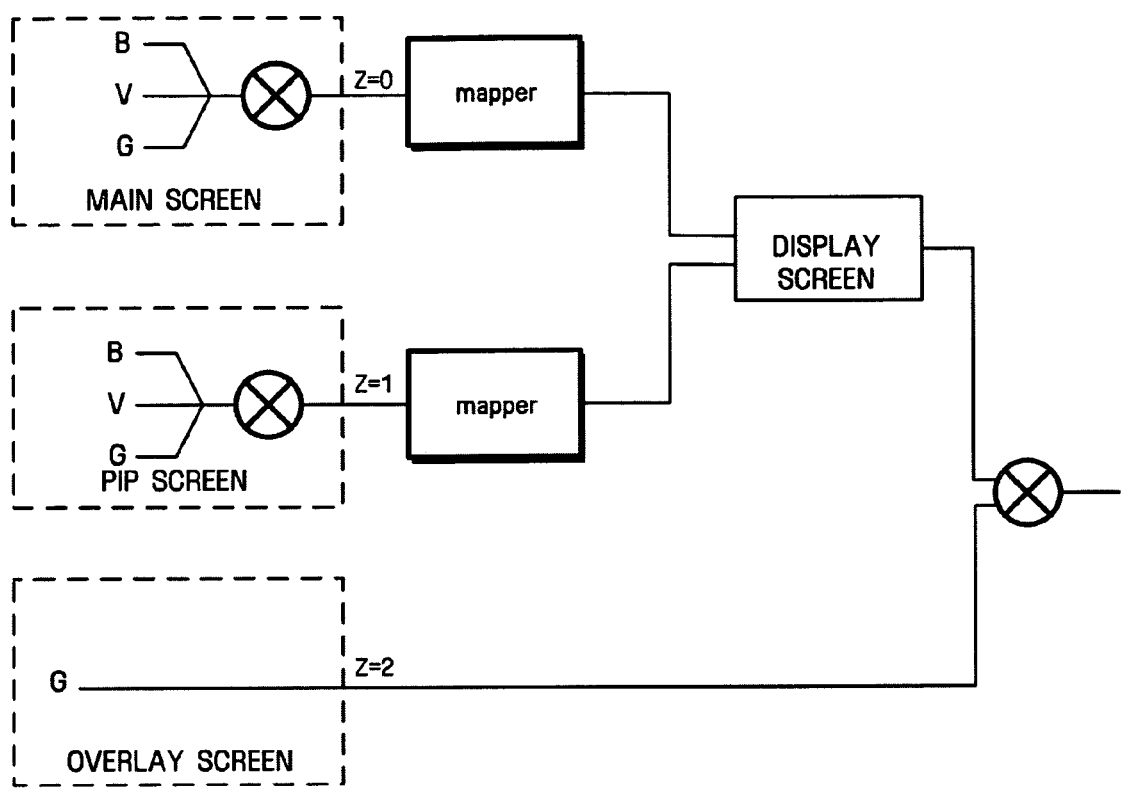

Referring to FIG. 3A, the main screen including a combination of a background still image B, a video raster V, and a graphic raster G is mapped to the entire display screen by a mapper with a normal size. The PiP screen including only video components is mapped to the entire display screen by the mapper with a reduced size. In this case, the mapped PiP screen is displayed on the main screen, which is determined depending on a Z value. The reference character Z refers to z-order value which will be described later. An overlay screen may be combined with the display screen. The overlay screen is a specific screen disposed at the outmost side, and may be used when providing a caption function. The PiP screen may have only a video component as illustrated in FIG. 3A, or may have a combination of the background still image B, the video raster V, and the graphic raster G as illustrated in FIG. 3B.

Figure 3C:
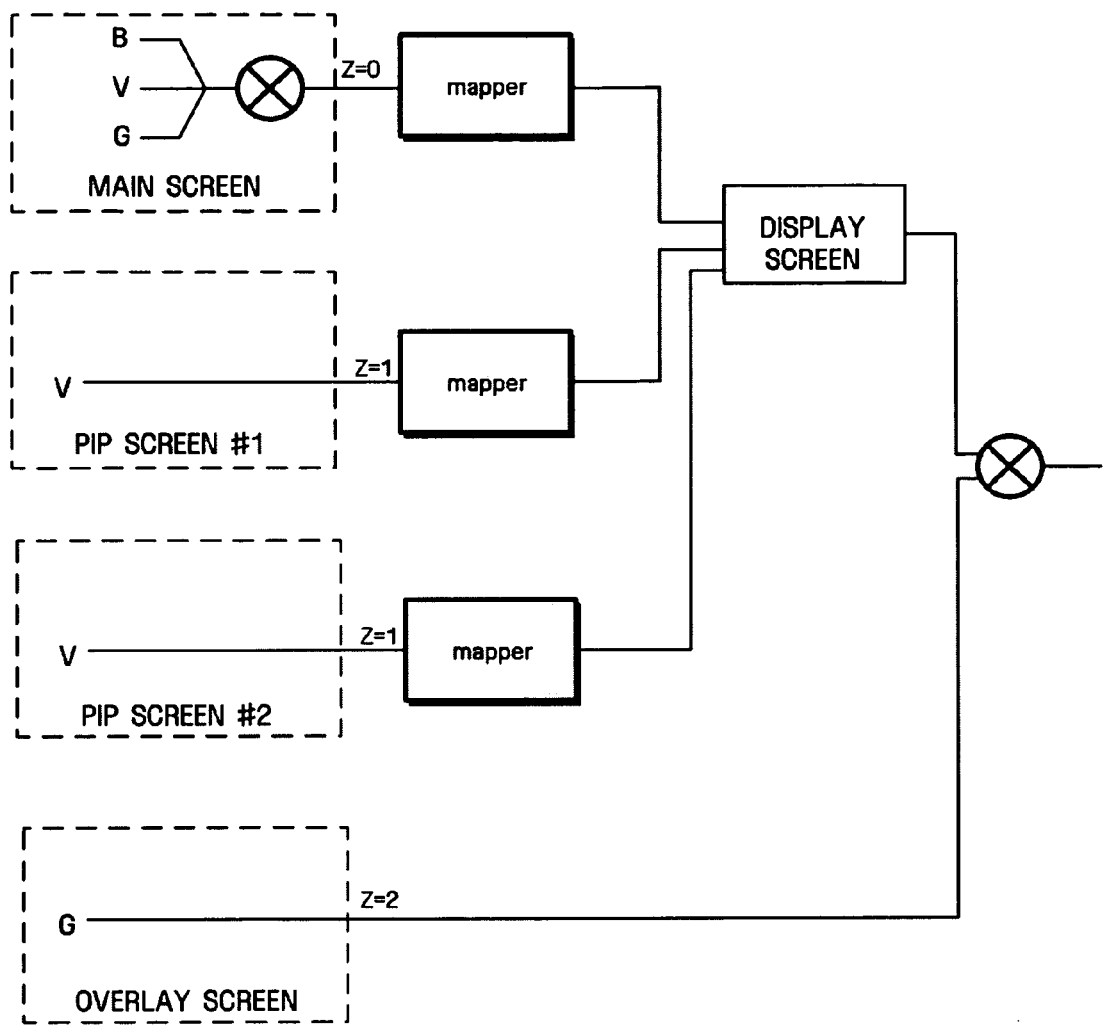
Figure 3D:
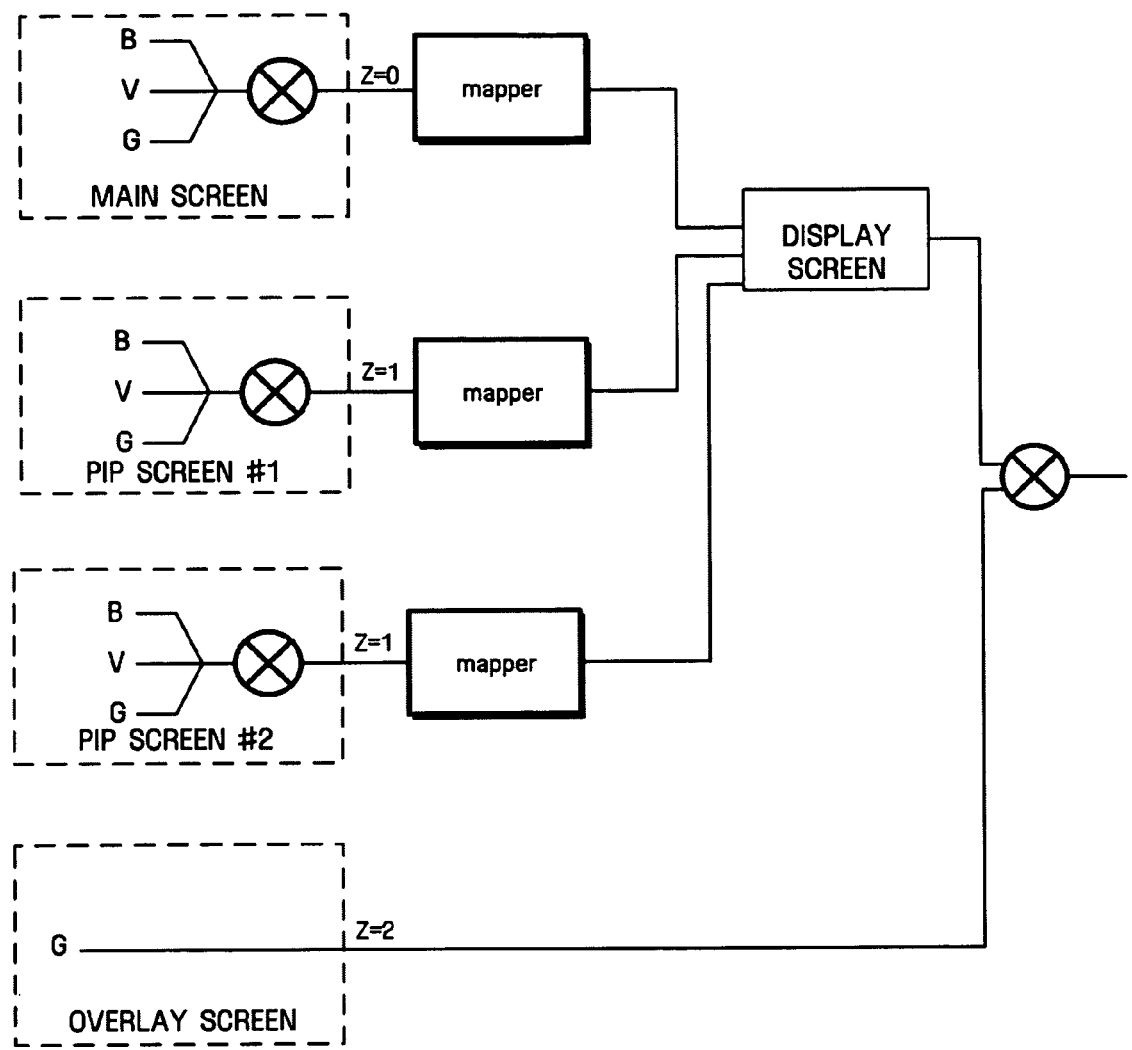

Referring to FIG. 3C, the main screen including the combination of the background still image B, the video raster V, and the graphic raster G is mapped to the entire display screen by the mapper with a normal size. Two PiP screens #1 and #2 having only video component is mapped to an arbitrary area of the display screen by the mapper with a reduced size. In this case, the mapped PiP screen is disposed on the main screen and the Z value can be constantly maintained. Further, the overlay screen may be combined with the display screen. The configuration of the screen may have a plurality of PiP screens including only video components as illustrated in FIG. 3C or a plurality of PiP screens including a combination of the background still image B, the video raster V, and the graphic raster G as illustrated in FIG. 3D.

Figure 3E:
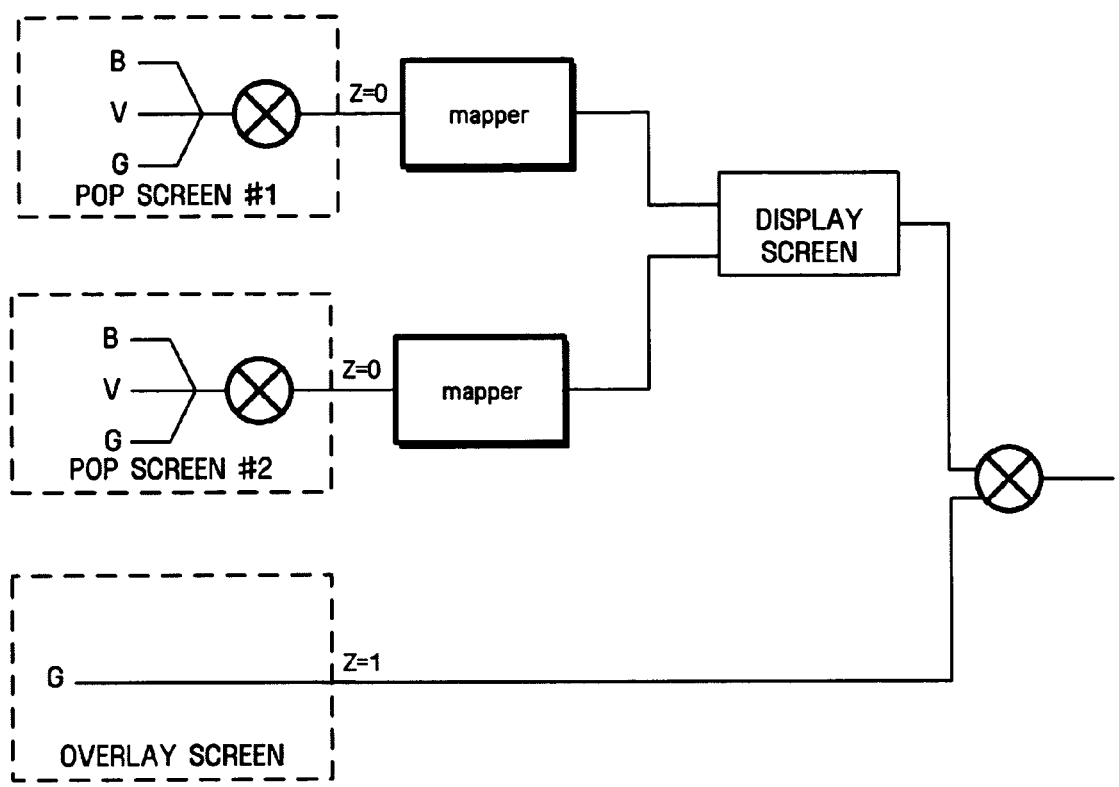

Picture-on-picture (POP) screens are illustrated in FIG. 3E. It can be understood that the conventional PiP screen is displayed inside the main screen and the POP screen is displayed outside the main screen. Referring to FIG. 3E, the plurality of PiP screens #1 and #2 including a combination of the background still image B, the video raster V, and the graphic raster G are mapped to arbitrary areas of the display screen by the mapper with a reduced size. In this case, the Z value of the mapped POP screens #1 and #2 may be constantly maintained. Further, the overlay screen may be combined with the display screen.

The mapping block 230 may be realized by interfaces or functions prepared by various computer program languages to be executed and create or change the relationship between the logical screen and the display screen by using the above information as parameters.

Also, the mapping block 230 may be realized by a hardware which has a mapping function between a logical screen and a display screen.

Figure 4:
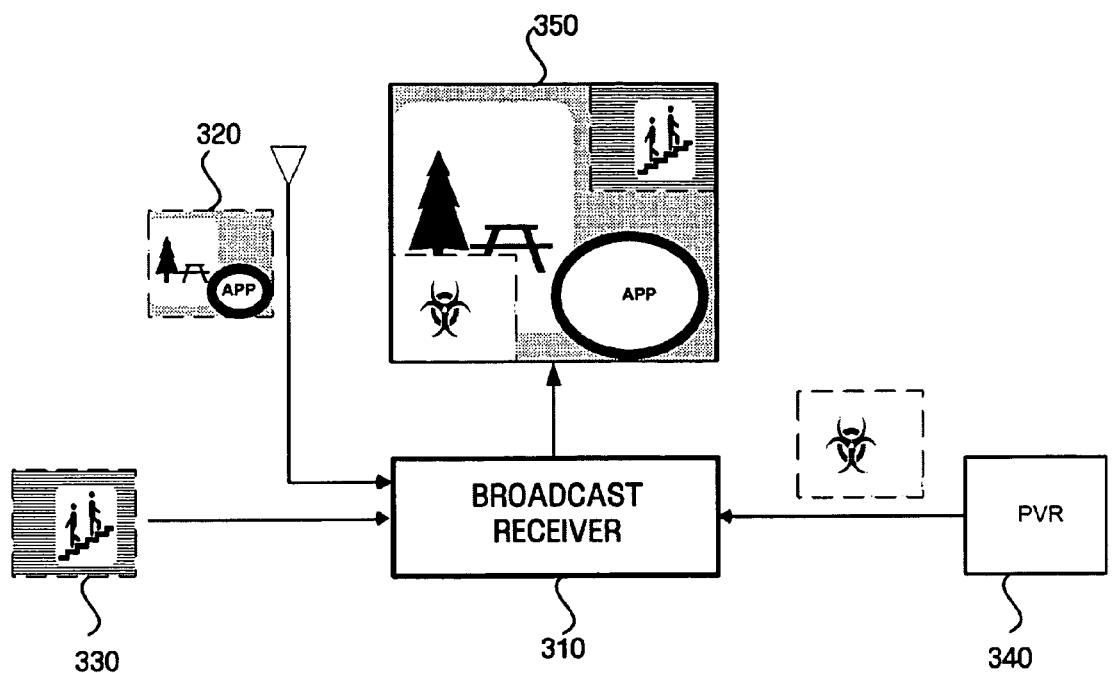
FIG. 4 is a block diagram illustrating service sources according to an exemplary embodiment of the present invention.

Further, services provided by various service sources may be displayed on a display screen, and the display screen may be displayed on a physical display device, as illustrated in FIG. 4.

There are service sources which provide broadcast services such as a terrestrial broadcaster 320 and a cable broadcaster 330, service sources which provide services stored in a storage medium such as a personal video recorder (PVR) 340, and service sources (not illustrated in FIG. 4) which provide services via a wired network or a wireless network.

A broadcast receiver 310 receives services from the service sources and generates logical screens displaying each of the received services.

Then, an arbitrary service is directly set on the display screen to be displayed on a physical display device using a predefined method or a method set by a user or an application. Otherwise, at least one logical screen that is mapped to an arbitrary area on the display screen is displayed on a physical display device 350. In short, services provided by the terrestrial broadcaster 320, the cable broadcaster 330, and the PVR are displayed on the physical display device 350.

The terrestrial broadcaster 320, the cable broadcaster 330, and the PVR 340 are illustrated in FIG. 4 as being service sources, but the present invention is not limited to it. Any type of multimedia content source which provides multimedia contents that can be displayed together can be a service source according to an exemplary embodiment of the present invention.

Figure 5A:
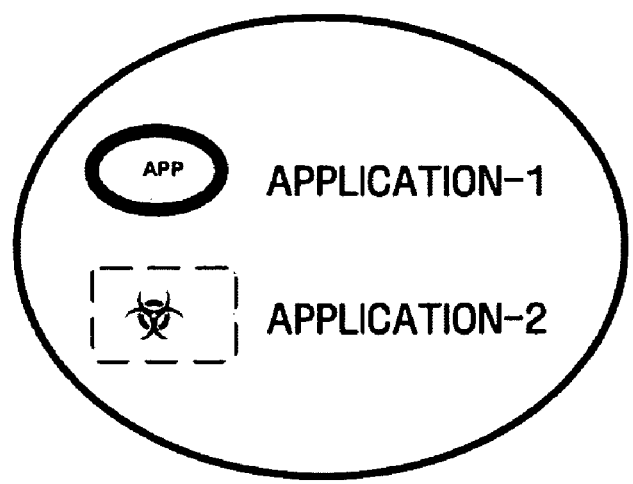
FIGS. 5A and 5B are diagrams illustrating a non-abstract service and an abstract service according to an exemplary embodiment of the present invention.
Figure 5B:
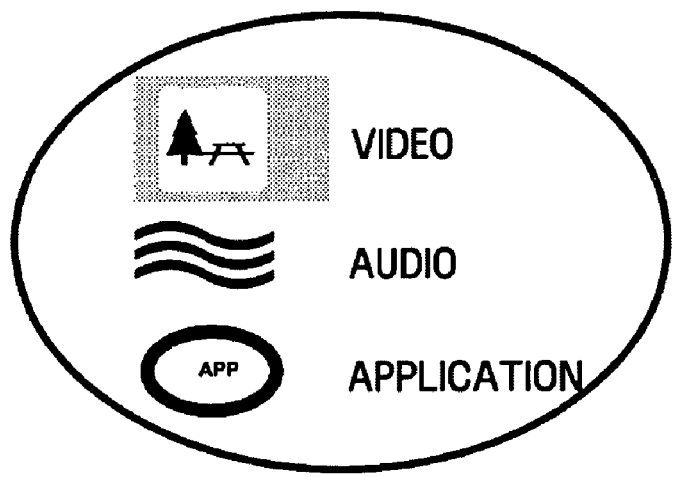

Services according to an exemplary embodiment of the present invention can be classified into abstract services and non-abstract services, as illustrated in FIGS. 5A and 5B.

The abstract services are not services provided by broadcast signals transmitted in real time but services independent of broadcast channels. The abstract services include only data components, i.e., applications, without video components and audio components. Examples of the abstract services include services having unbound applications based on the standard.

The non-abstract services are understood as services other than abstract services.

According to the current exemplary embodiment of the present invention, both abstract services and non-abstract services have independency. For example, abstract services may be directly set on the physical display device not through logical screens and non-abstract services may be displayed on the logical screens. Then, the logical screens may be mapped to the display screen in which the abstract services are set. Thereafter, the display screen may be output through the physical display device. By doing so, the abstract services can be displayed on the display screen independently of the non-abstract services. In addition, the abstract services and non-abstract services may be mapped to different logical screens. Thereafter, the logical screens may be mapped to a single display screen. In other words, the abstract services can be displayed on the display screen independently of non-abstract services.

According to the current exemplary embodiment of the present invention, the logical screen and the display screen may be categorized as being different objects. Alternatively, a screen may serve as a logic screen or a display screen according to attribute information of one screen object.

In detail, whether a screen object is a logical screen or a display screen depends on the 'type' information among screen object attributes.

The screen object attributes includes 'Type', 'z-Order', 'Display_Area', 'Visibility', 'Associated_Display_Screen', 'Associated_Service_Contexts', and 'OutputPort'.

Figure 6:
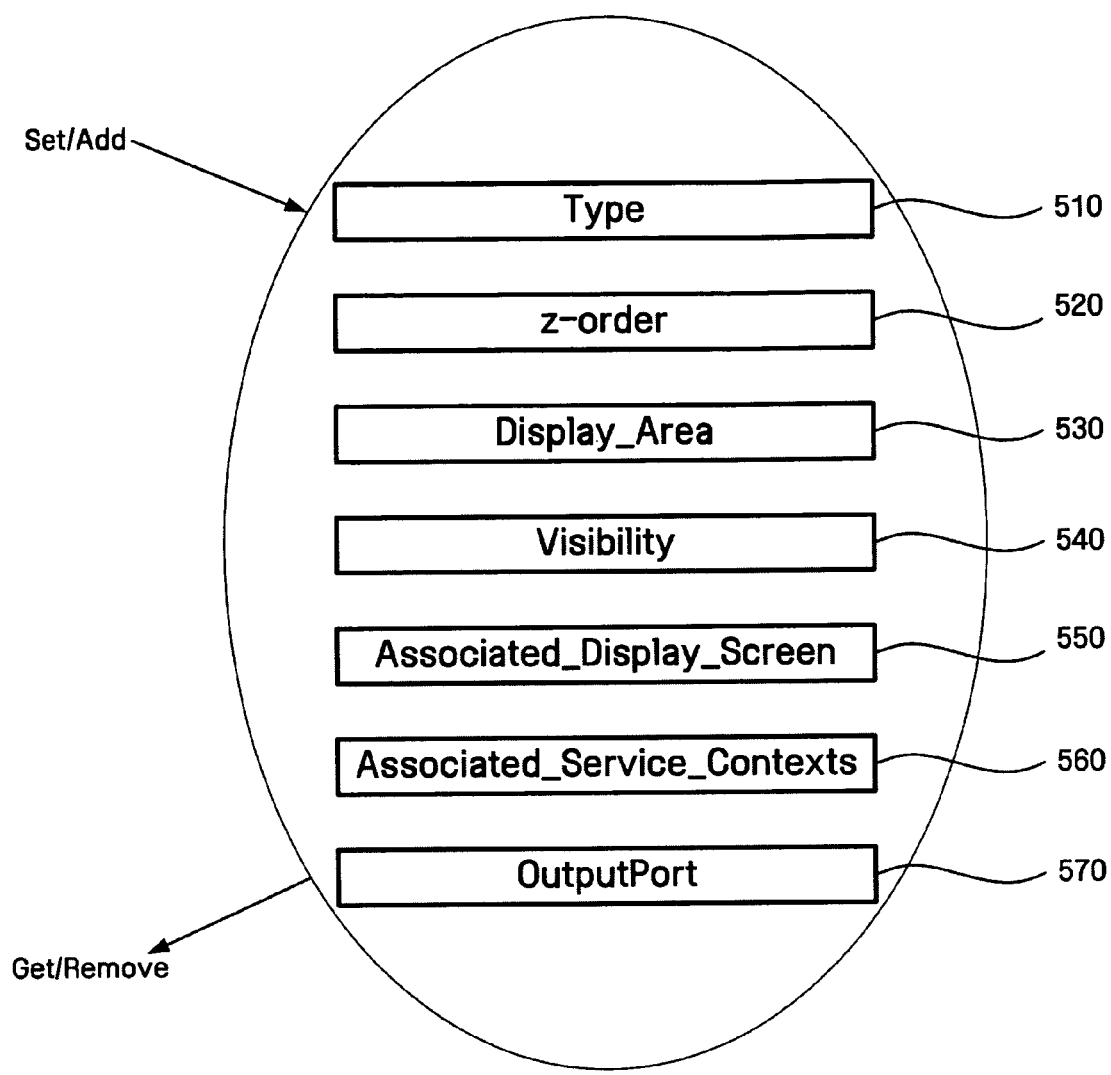
FIG. 6 is a diagram illustrating attribute information and interfaces of a logical screen and a display screen.

FIG. 6 illustrates attribute information of a screen object and interfaces for processing the attributes of the screen.

An attribute 'Type' 510 is for determining a screen type—a logical screen or a display screen.

Figure 7:
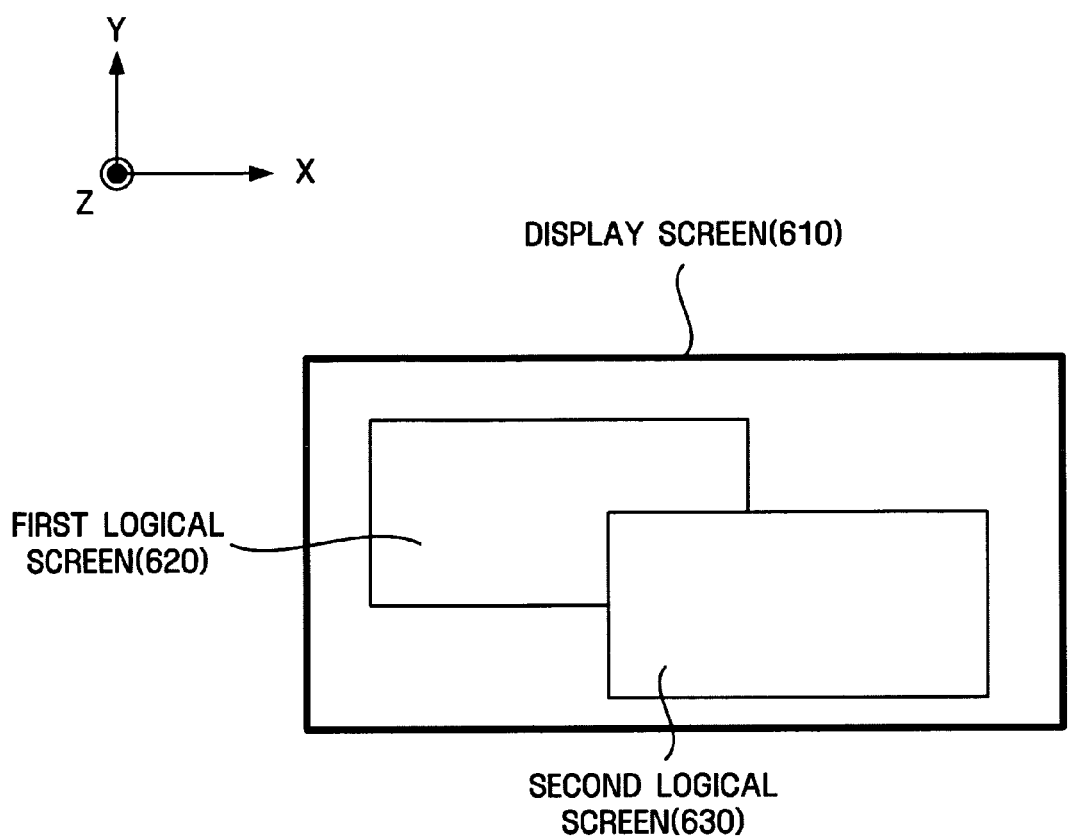
FIG. 7 is a diagram illustrating an attribute 'z-order' of a logical screen according to an exemplary embodiment of the present invention.

An attribute 'z-Order' 520 is for determining in what order a plurality of logical screens are arranged along the z-axis. FIG. 7 illustrates a configurations of logical screens on a physical display device for a combination of the values of attributes 'z-Order' of the logical screens.

Referring to FIG. 7, first and second logical screens 620 and 630 are respectively mapped to predetermined areas of a display screen 610. In detail, the first logical screen 620 is displayed on the display screen 610, and the second logical screen 630 is displayed on the display screen partially overlapping the first logical screen 620. In other words, the display screen 610, the first logical screen 620, and the second logical screen 630 are sequentially arranged in the direction of the z-axis. In this case, an attribute 'z-Order' of the first logical screen 620 may be set to a value of 1, and an attribute 'z-Order' of the second logical screen 630 may be set to a value of 2. The attributes 'z-Order' of the first and second logical screens 620 and 630 may be set to any numbers or characters as long as they can represent a certain order in which the first and second logical screens 620 and 630 are to be arranged along the z-axis.

Figure 8A:
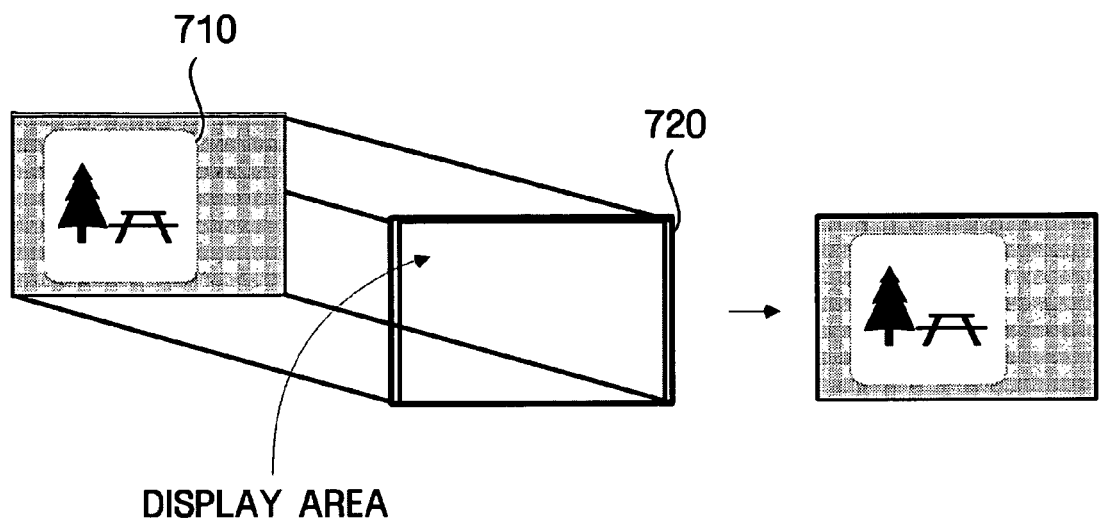
FIGS. 8A and 8B are diagrams each illustrating an attribute 'Display_Area' of a logical screen according to exemplary embodiments of the present invention.
Figure 8B:
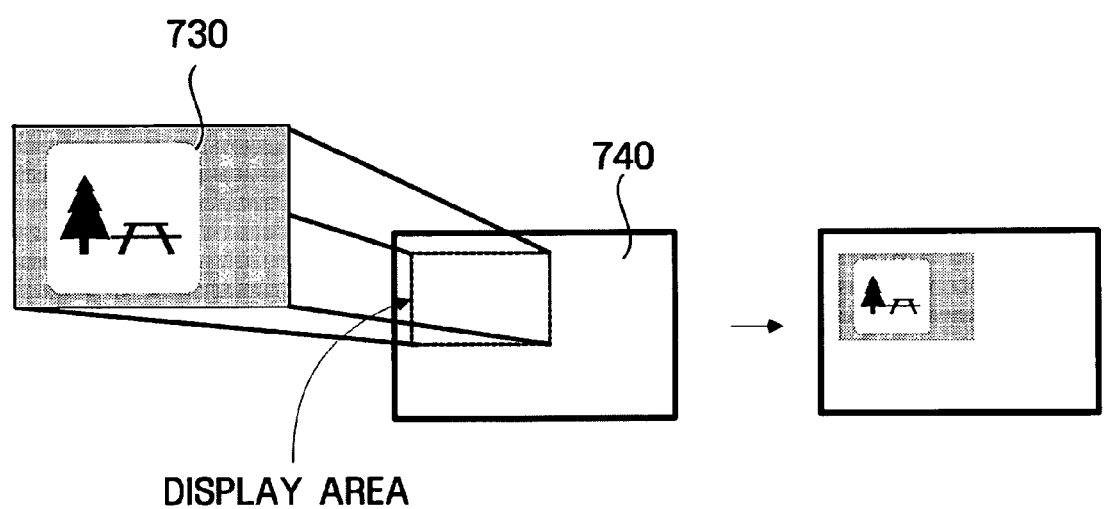

An attribute 'Display_Area' 530 is information regarding a display screen area of a logical screen, as to be illustrated in FIGS. 8A and 8B.

FIG. 8A illustrates that a logical screen 710 is mapped to an entire area of the display screen 720, and FIG. 8B illustrates that a logical screen 730 is mapped to a partial area of the display screen 740.

The attribute 'Display_Area' may include information specifying the two-dimensional coordinates of a predetermined portion of a display screen to which the logical screen is to be mapped or may include information specifying a predetermined location on the display screen and an offset value indicating how much the logical screen deviates from the predetermined location on the display screen.

An attribute 'Visibility' 540 determines whether a logical screen is to be visibly or invisibly displayed on a display screen. It is possible to make a logical screen appear on or disappear from a display screen by altering the value of the attribute 'Visibility' 530.

An attribute 'Associated_Display_Screen' 550 is information regarding display screens associated with a logical screen. A logical screen which is not associated with any display screens may not be displayed on a physical display device nor be transmitted to external output devices.

An attribute 'Associated_Service_Contexts' 560 is information regarding service contexts connected to a logical screen or a display screen. Services set in such service contexts may be displayed on a logical screen or a display screen.

An attribute 'OutputPort' 570 is information regarding devices by which a display screen is to be output, and such devices include display screens, wired/wireless communication media, and various storage media.

Interfaces for identifying or altering the values of the attributes illustrated in FIG. 6 may be provided. Referring to FIG. 6, the interfaces may include an interface 'SET' for setting attribute values or connecting a logical screen to a display screen, an interface 'ADD' for adding attribute values or connecting a logical screen to a service, an interface 'GET' for identifying attribute values, and an interface 'REMOVE' for deleting attribute values. These interfaces may include processes, functions, procedures, or methods that perform their functions, respectively.

For example, a method 'getDisplayScreen(void)' returns a display screen associated with the current screen. In detail, if the current screen is a logical screen, the method 'getDisplayScreen(void)' returns the associated display screen. If the current screen is display screen, the method 'getDisplayScreen(void)' returns reference information regarding the current screen. Further, if the current screen is a logical screen, but there is no associated screen, the method 'getDisplayScreen(void)' returns a value of 'NULL'.

According to another example, a method 'public void setDisplayArea(HScreenRectangle rect) throws SecurityException, IllegalStateException' provides a function for mapping the current logical screen to a predetermined area of the associated display screen. An instance that is provided as a parameter is of a class 'HScreenRectangle' of a package 'org.havi.ui', and has two-dimensional position information. The execution of the methods 'SecurityException' and 'IllegalStateException' may be conducted as an exceptional operation for the method 'setOutputScreen(HScreen screen)

'. The method 'IllegalStateException' may be executed when the current screen is a logical screen or when a portion of a display screen associated with a current logical screen cannot change due to the characteristics of a host platform.

According to still another example, a method 'getOutputArea(void)' returns regional information of a current screen as HScreenRectangle information. If the current screen corresponds to a display screen, the method 'getOutputArea (void)' returns HScreenRectangle information having the same value as HScreenRectangle (0,0,1,1). If the current screen is a logical screen, the method 'getOutputArea(void)' returns information regarding an area on a display screen occupied by the current screen. If the current screen is a logical screen but is not associated with any display screen, the method 'getOutputArea(void)' returns a value 'NULL'.

Certain terms are used throughout the following description to refer to particular interfaces. However, one skilled in the art will appreciate that a particular function is named simply to indicate its functionality. This detailed description of the exemplary embodiments does not intend to distinguish between functions that differ in name but not function.

FIG. 9 is a diagram illustrating a process that two services are set on two logical screens to be mapped to a single display screen.

Referring to FIG. 9, a first service includes all the three service components, i.e., video, audio, and data components, and a second service includes only video and audio components. However, the present invention does not impose any restrictions on service components, and the first and second services illustrated in FIG. 8 are exemplary.

As illustrated in FIG. 9, the first and second services are displayed on a physical display device in almost the same manner as in the related art. According to the current exemplary embodiment of the present invention, it is possible to display a plurality of services on a physical display device independently of one another without imposing any restrictions on the number of services that can be displayed on a single display screen.

Figure 10:
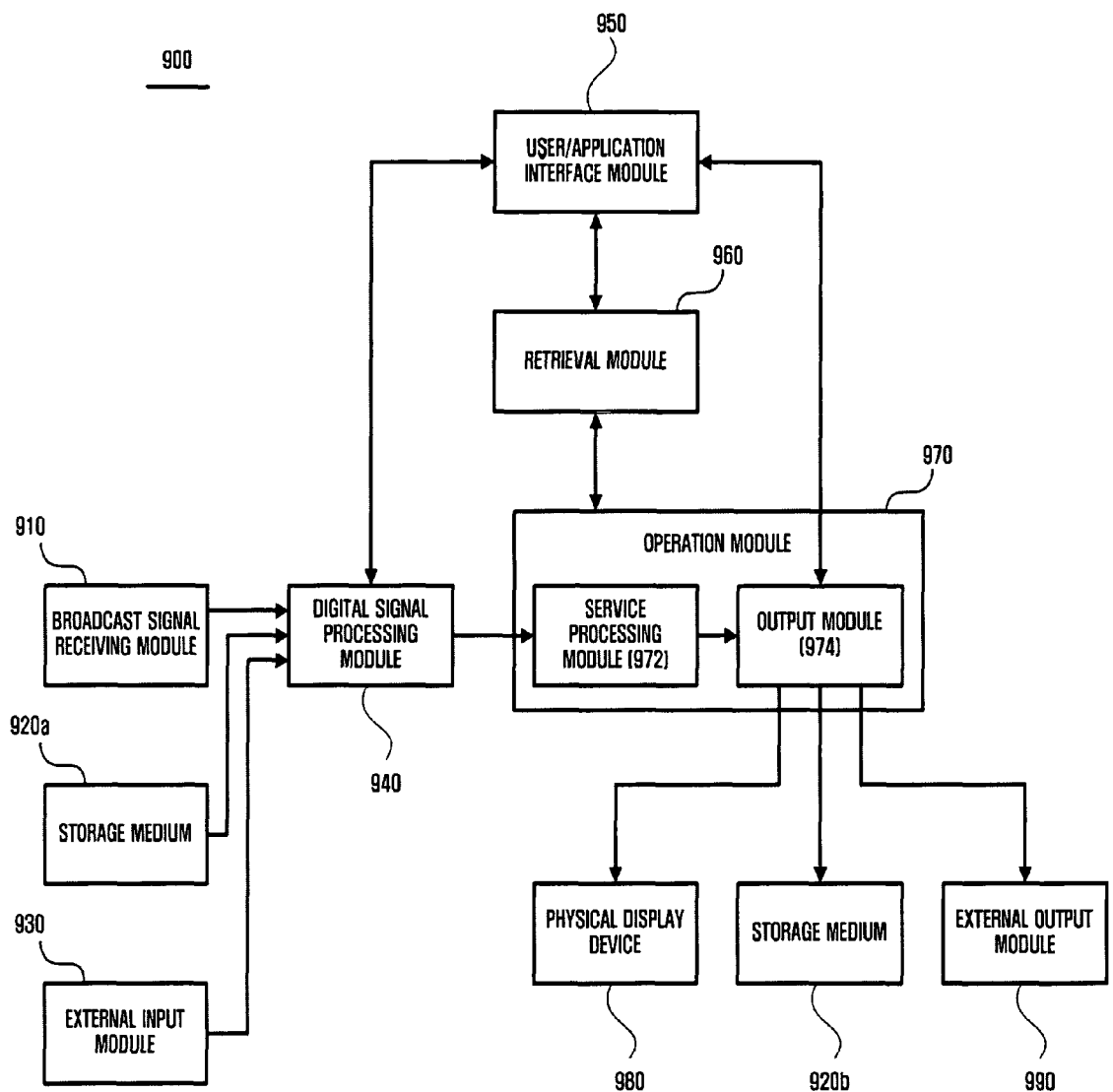
FIG. 10 is a block diagram illustrating a configuration of an apparatus for providing multiple screens according to an exemplary embodiment of the present invention.

FIG. 10 is a block diagram of an apparatus for providing multiple screens according to an exemplary embodiment of the present invention.

Referring to FIG. 10, an apparatus 900 for providing multiple screens includes a digital signal processing module 940, an operation module 970, a user/application interface module 950, and a retrieval module 960.

Also, the apparatus 900 includes a broadcast signal reception module 910, a storage medium 920a, and an external input module 930 as service sources, and includes a physical display device 980, a storage medium 920b, and an external output module 990 as service output media.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The digital signal processing module 940 receives various information of a service such as a multimedia content, e.g., video information, audio information, or data information, from the broadcast signal reception module 910, the storage medium 920a, or the external input module 930.

The broadcast signal reception module 910 receives a satellite, terrestrial, or cable broadcast signal and transmits the received broadcast signal, the storage medium 920a stores video information, audio information, or data information of a service, and the external input module 930 receives video information, audio information, or data information of a service from an external device such as a network interface module connected to a network.

The digital signal processing module 940 restores a plurality of services using received service components. The restored services include abstract or non-abstract services.

Here, the phrase 'a plurality of services' refers to two or more services transmitted by the broadcast signal reception module 910 or two or more services respectively transmitted by the broadcast signal reception module 910 and the storage medium 920a.

The digital signal processing module 940 may restore services according to selection by a user or an application with the aid of the user/application interface module 950. In this case, the user or the application may select the connection between an arbitrary service and a screen.

The operation module 970 displays a service restored by the digital signal processing module 940 and then maps a logical screen to a display screen or directly displays the service on the display screen. For this purpose, the operation module 940 may include a service processing module 972 or an output module 974.

The service processing module 972 generates one or more logical screens to display the services restored by the digital signal processing module 940.

The output module 974 maps a plurality of logical screens generated by the service processing module 972 to the display screen. The mapping of the logical screens to the display screen may be conducted using a predefined method or a method set by the user with the aid of the user/application interface module 950.

A service restored by the digital signal processing module 940 may not be processed by the service processing module 972. Instead, a service restored by the digital signal processing module 972 may be directly mapped to a certain portion of a display screen generated by the output module 974.

A display screen provided by the output module 974 may be displayed on the physical display device 980 or may be stored in the storage medium 920b. Examples of the storage medium 920b include computer readable floppy discs, hard discs, CD-ROM. DVD, DVD-ROM, BD (Blu-ray Disc), and semiconductor memories.

Also, a display screen provided by the output module 974 may be transmitted to an external device connected to a network via the external output module 990.

For this, the output module 974 may include a plurality of output ports via which a display screen can be provided. In this case, a display screen can be provided via an output port set in advance as a default or an output port chosen by the user with the aid of the user/application interface module 950.

The retrieval module 960 retrieves the type of screens in the system and the connection relationship therebetween. Such retrieval is classified into four types, for example, a first retrieval process that retrieves a screen on which an application included in the received service is being executed, among at least one of screens, a second retrieval process that retrieves all of logical screens and display screens generated in the system, a third retrieval process that retrieves a logical screen that displays the received service and a display screen to which the logical screen is mapped, a fourth retrieval process that retrieves that a screen displaying the received service is a logical screen or a display screen.

In this case, a screen to be retrieved through the first to fourth retrieval processes may be a logical screen or a display screen.

During the first retrieval process, the retrieval module 960 can retrieve a setting type of a screen on which an application is executed. The setting type includes at least one of a single screen type, an overlay screen type, a PiP screen type, an overlay PiP screen type, a Picture-on-Picture (PoP) screen type, an overlay PoP screen type, and a general screen type other than the above screens. According to the single screen type, a screen on which an application is executed corresponds to a display screen. In the overlay screen type, the single screen coexists with at least one of overlay screens. In the PiP screen type, the screen on which an application is executed corresponds to a logical screen that is mapped to an entire area of the display screen, and at least one of non-overlay logical screen that is mapped to the display screen, but does not correspond to an overlay screen. In the overlay PiP screen type, the PiP screen coexists with at least one of overlay screens. In the PoP screen type, the screen on which an application is executed corresponds to a combination of at least two non-overlay logical screens that are mapped to an entire area of the display screen, but does not correspond to an overlay screen. In the overlay PoP screen type, the PoP screen coexists with at least one of overlay screens.

During the second retrieval process, the retrieval module 960 can perform retrieval only on a logical screen and a display screen only when an authority is given to an application referring to the authority range of the application. The authority range of the application is empowered by a service provider, and the retrieval module 960 retrieves only some screens that are included in the authority range of the application among screens created by the operation module 970. Meanwhile, when there is no authority empowered by a service provider, the retrieval module 960 can all of logical screens and display screens.

During the fourth retrieval process, when a screen on which an application is being executed is a logical screen (hereinafter, referred to as executing logical screen), the retrieval module 960 can retrieve a position and a size of the executing logical screen on the display screen, and an overlay relationship between the executing logical screen and another logical screen on the display screen. In this case, the position of the executing logical screen includes a plane coordinate on the display screen and an order 'Z-order' that is an order on a Z-axis.

Further, during the fourth retrieval process, the retrieval module 960 can retrieve a service context of the retrieved screen.

The retrieval module 96 retrieves according to a control command input by a user or a control command of an application supplied from a service provider. Retrieval by the control command of the application means a retrieval that is performed by the retrieval module 960 according to a currently transferred application or a previously stored application.

The user or the application can choose one of a plurality of services or restore desired services using the user/application interface module 950. Also, the user can choose one of a plurality of display screens using the user/application interface module 950. In order to perform the above operations, the user/application interface module 950 may use a result retrieved by the retrieval module 960.

Since the modules illustrated in FIG. 10 are divided according to their functions, it is possible to be connected to the other modules.

Figure 11:
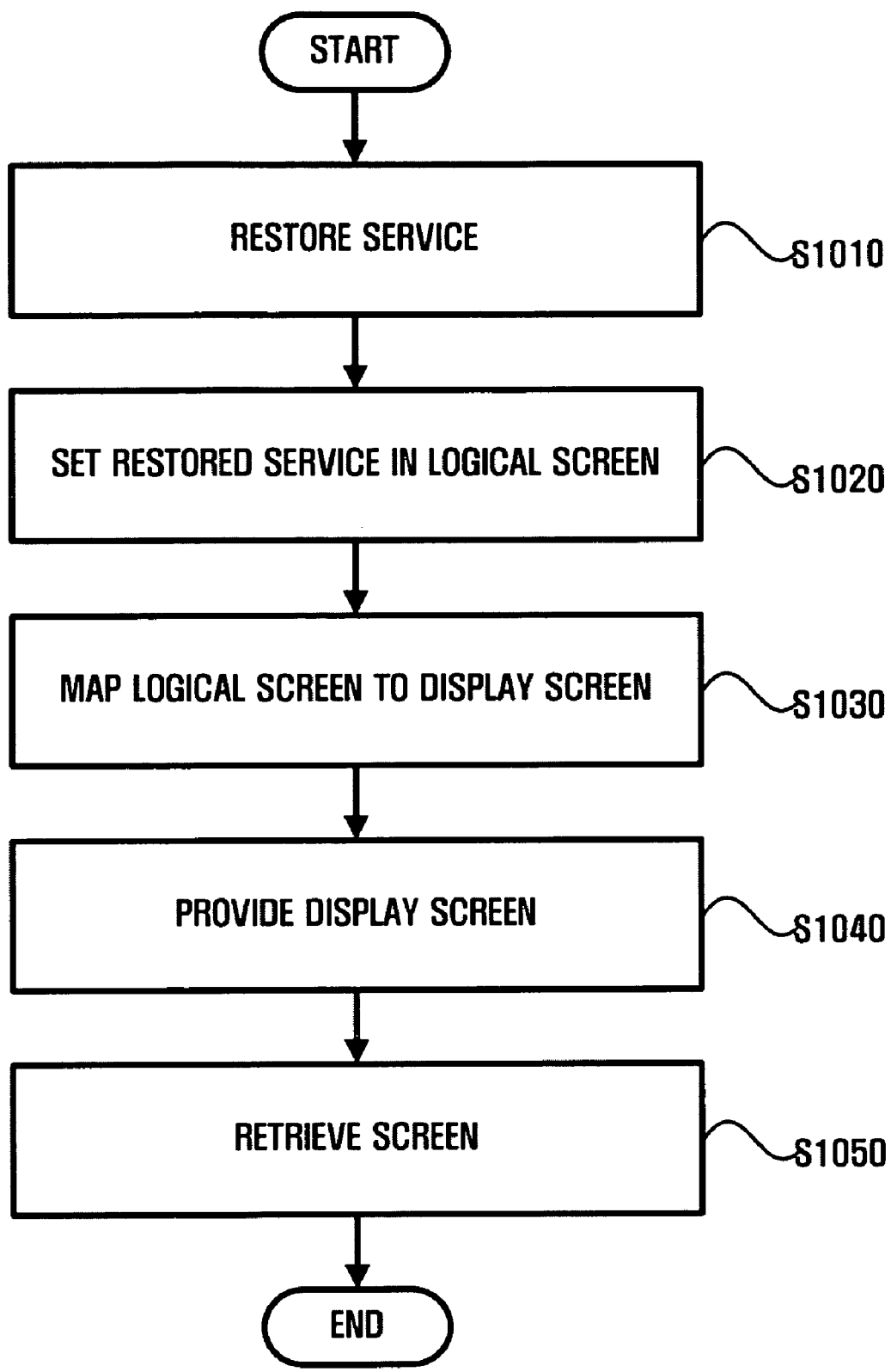
FIG. 11 is a flowchart illustrating a method of dynamically configuring multiple screens according to an exemplary embodiment of the present invention.

FIG. 11 is a flowchart illustrating a method of dynamically configuring multiple screens according to an exemplary embodiment of the present invention.

In general, video information, audio information, and data information constituting a multimedia content are transmitted in a predetermined format, for example, an MPEG stream format. In operation S1010, an apparatus for providing a service such as a multimedia content service receives video information, audio information, and data information and restores a service based on the video information, the audio information, and the data information. Here, the service restored in operation S1010 may be selected or previously determined by a user or an application. The user may use a menu displayed on the display device or a remote controller to select the connections between an arbitrary screen and a screen. The application may select the connections using an API.

Further, data information includes application information regarding application for a service, and this application information includes signal information indicating whether the application can be executed on a PiP screen. Examples of the application information include an application information table (AIT) based on the MHP standard and an eXtended application information table (XAIT) based on the OCAP standard. The signal information may be added to the application information.

Thereafter, in operation S1020, the restored service is set such that it can be displayed on a logical screen. In operation S1030, the logical screen is mapped to a display screen. In operation S1040, the display screen is provided to the user using a display screen, a storage medium, or a network.

After creating the logical screen and the display screen, in operation S1050, the retrieval module 960 retrieves the created screens. The retrieval done by the retrieval module 960 includes the first to fourth retrieval processes, which may be performed by a control command by a user or application input through the user/application interface module 950. The detailed description of the retrieval process was provide above with reference to FIG. 10.

The restored service is illustrated in FIG. 11 as being displayed on a physical display device via a logical screen. However, the restored service may be directly displayed on a physical display device without passing through the logical screen.

When the user selects the PiP service, the PiP service is realized in two modes. In the first mode, only video component for PiP service selected on the main screen is provided without creating a separate logical screen for PiP service, that is, PiP screen. In the second mode, a separate logical screen for PiP service is created to provide the PiP service selected on the created PiP screen.

FIG. 11 illustrates a method of mapping only one service to a display screen for simplicity. However, a plurality of services may be mapped to a display screen with or without passing through a plurality of logical screens.

When a display screen is provided to the user in this manner, the user can perform a plurality of services.

Figure 12:
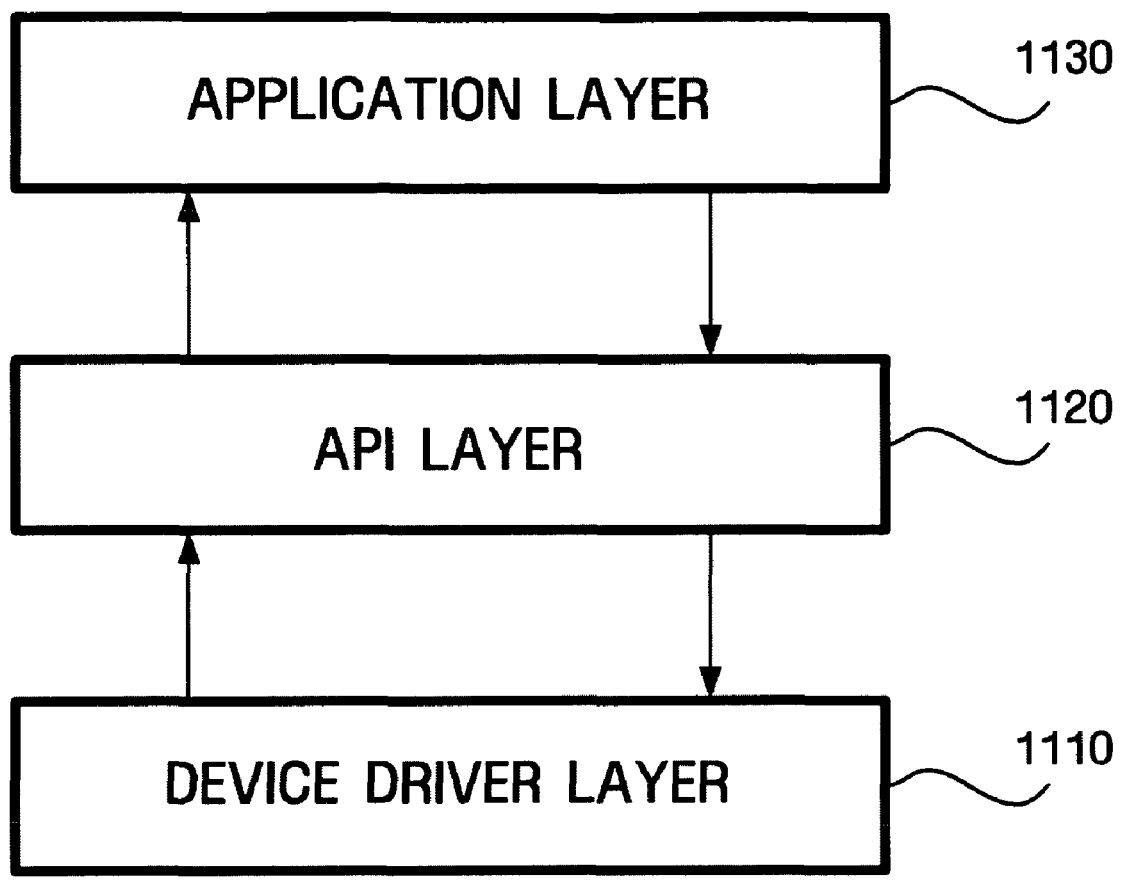
FIG. 12 is a diagram illustrating software architecture for providing multiple screens according to an exemplary embodiment of the present invention.

FIG. 12 is a diagram illustrating software architecture for providing multiple screens according to an exemplary embodiment of the present invention.

Referring to FIG. 12, software architecture 1100 includes a device driver layer 1110, layer 1120, and an application layer 1130.

The device driver layer 1110 receives service components from various multimedia content sources and decodes the received service components. Examples of the received service components include video information, audio information, and data information.

The API layer 1120 generates a logical screen and a display screen and maps a service, the logical screen, and the display screen to one another.

The application layer 1130 provides a user interface so that a user can dynamically configure a logical screen which displays a service or transmits a user command to the API layer 1120 so that the API layer 1120 can execute the user command.

In order to perform the above operations, the application layer 1130 can operate through a currently transferred application or a previously stored application and the screen retrieval operation can be performed by the application layer 1130.

The user enables the device driver layer 1110 with the aid of the application layer 1130 to provide a display screen via a physical display device or to store the display screen in a storage medium 920b. In addition, the user can enable the device driver layer 1110 to transmit a display screen to an external device via a network.

For this, the device driver layer 1110 may include a plurality of output ports which can provide a display screen. Otherwise, API layer 1120 may include the plurality of output ports.

Figure 13:
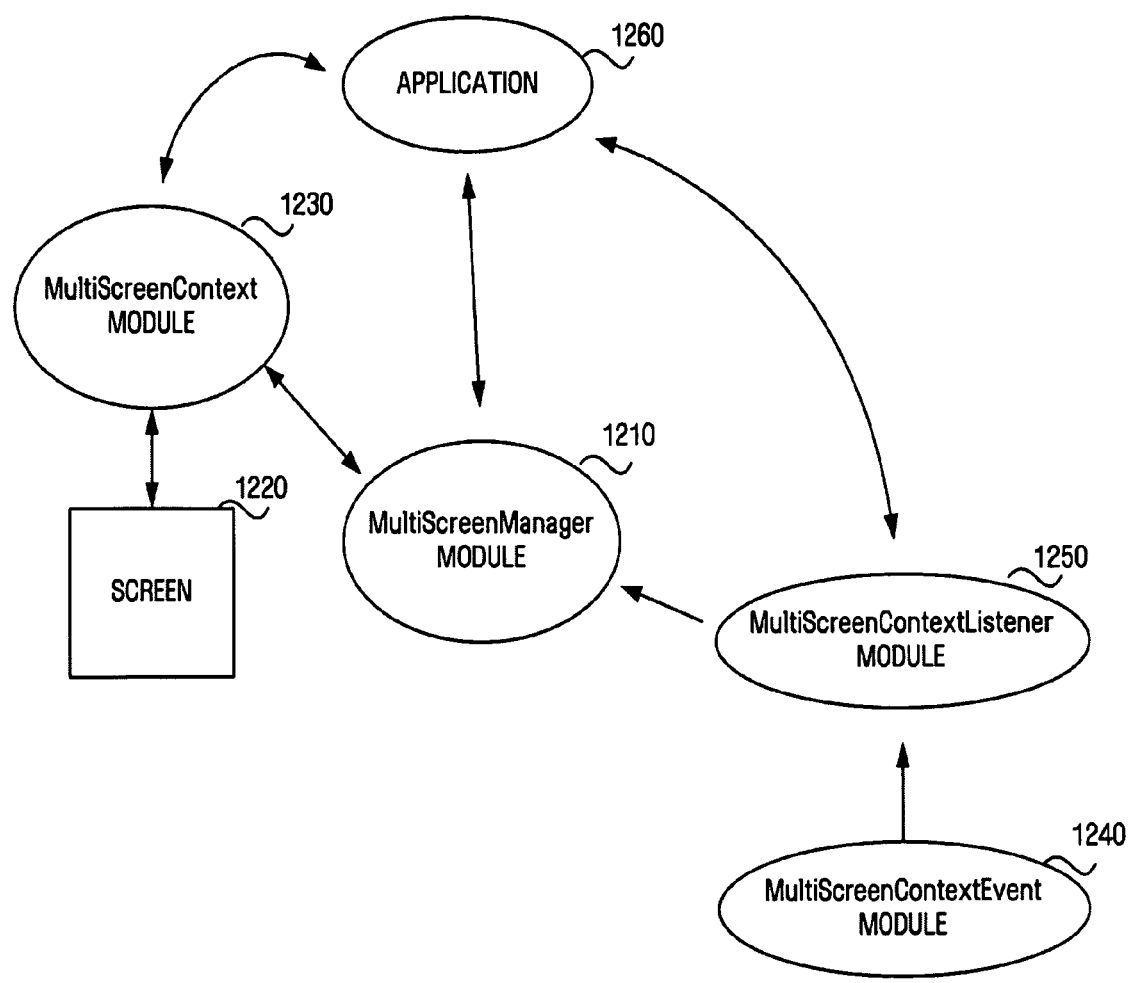
FIG. 13 is a diagram illustrating the relationships among modules constituting an application programming interface (API) layer according to an exemplary embodiment of the present invention.

In order to dynamically configure a plurality of logical screens on a display screen, the API layer 1120 may include a plurality of software modules, e.g., a multiscreen manager module 'MultiScreenManager' 1210, a multiscreen context module 'MultiScreenContext' 1230, a multiscreen context listener module 'MultiScreenContextListener' 1250, and a multiscreen context event module 'MultiScreenContextEvent' 1240, as illustrated in FIG. 13.

The multiscreen manager module 1210 manages the multiscreen context module 1230, retrieves for a desired screen, displays information specifying what devices are shared by screens, registers the multiscreen context listener module 1250, or cancels the registration of the screen context listener module 1250.

The multiscreen context module 1230 is an interface object associated with a screen object 1220 and determines whether the screen object 1220 is to become a logical screen or a display screen according to an interface operation performed by the multiscreen context module 1230. Various attributes such as the attributes 510 through 570 illustrated in FIG. 6 may be set in the multiscreen context module 1230. The multiscreen context module 1230 can provide the functions 'SET', 'ADD', 'GET', and 'REMOVE' described above with reference to FIG. 6.

When attribute information of the screen object 1220 is altered by the multiscreen context module 1230, the multiscreen context event module 1240 serves as an event class announcing that the attribute information of the screen object 1220 has been changed, and the multiscreen context listener module 1250 serves as a listener interface object which can be realized in a predetermined application class which attempts to receive an event prompted by the multiscreen context event module 1240.

An application 1260 is a module which is driven on the application layer 1130. The application 1260 allows the user to choose a desired service and to freely arrange a plurality of logical screens on a display screen.

In detail, the application 1260 transmits various commands which allow the user to dynamically configure and manage logical screens to the multiscreen manager module 1210, and the multiscreen manager module 1210 controls operations corresponding to the various commands to be executed through the multiscreen context module 1230.

The multiscreen context module 1230 is associated with the screen object 1220 and manages the attribute information of the screen object 1220 illustrated in FIG. 6. In order to manage the attribute information of the screen object 1220, the multiscreen context module 1230 may include a variety of functions or methods.

The multiscreen manager module 1210 may receive service components provided by various service sources from the device driver layer 1110 and perform operations to display the received service components on a logical screen or a display screen.

Further, the application retrieves the screens using the retrieval module 960, which will be described later with reference to FIG. 15.

Figure 14:
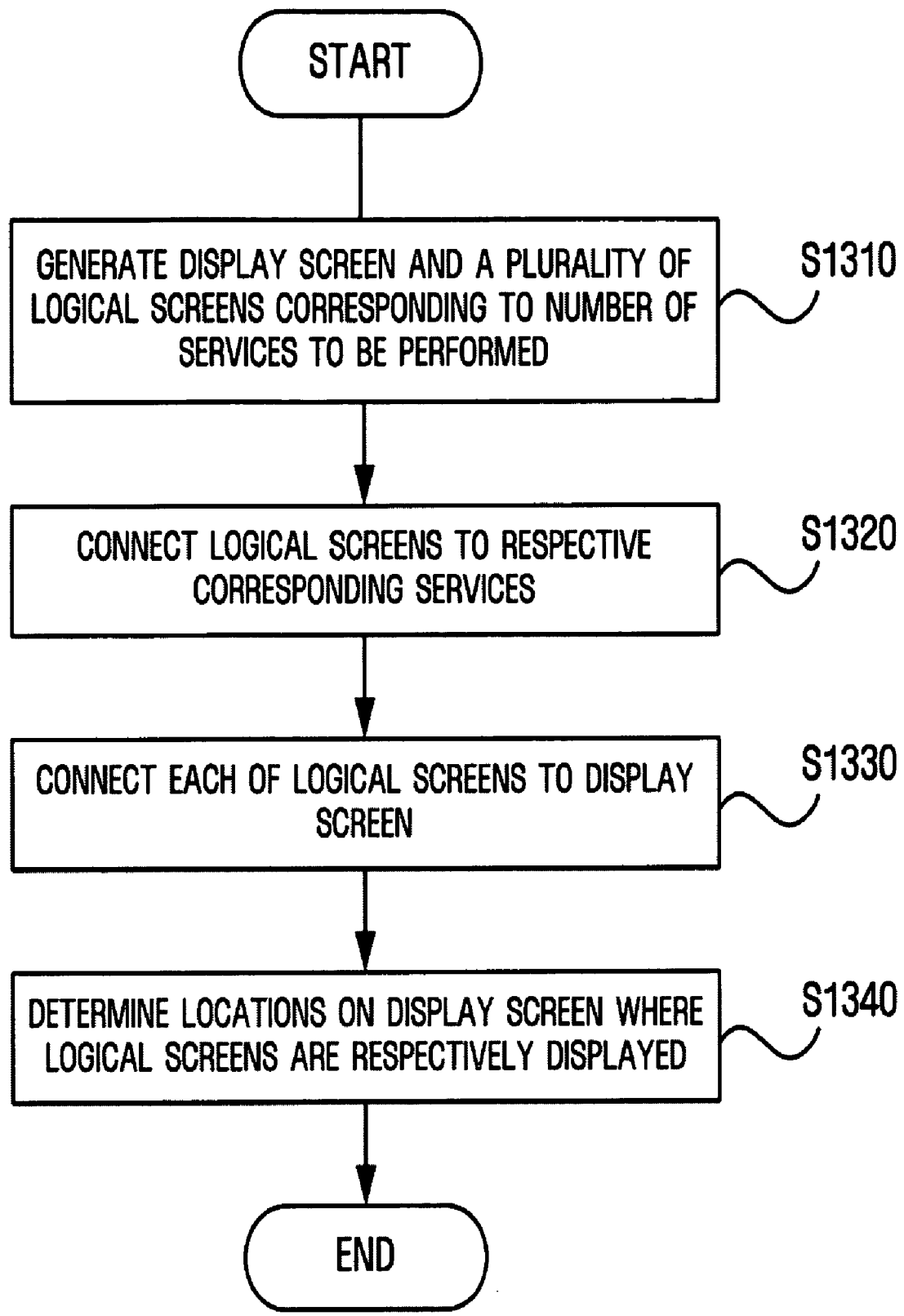
FIG. 14 is a flowchart illustrating a method of displaying a plurality of services that are displayed on respective corresponding logical screens on a display screen by the modules illustrated in FIG. 13 according to an exemplary embodiment of the present invention.

FIG. 14 is a flowchart illustrating a method of displaying a plurality of services displayed on respective corresponding logical screens by the modules illustrated in FIG. 13 on a display screen according to an exemplary embodiment of the present invention.

Referring to FIG. 14, in operation S1310, the multiscreen manager module 1210 generates a display screen and a number of logical screens corresponding to the number of services to be performed.

In operation S1320, the multiscreen manager module 1210 connects the logical screens to respective corresponding services received from the device driver layer 1110. The multiscreen manager module 1210 may call a method 'addServiceContext' for each of the logical screens by setting service context objects of the received services as parameters for the logical screens services. The method 'addServiceContext' connects a logical screen to a service and may be provided by the multiscreen context module 1230.

In operation S1330, once the logical screens are connected to the respective services, the multiscreen manager module 1210 connects the logical screens to the display screen. At this time, the multiscreen manager module 1210 may call a method 'setDisplayScreen' for each of the logical screens by setting a display screen object to which the logical screens are connected as a parameter. The method 'setDisplayScreen' connects a logical screen to a display screen and may be provided by the multiscreen context module 1230.

A method 'setDisplayScreen' may be set to 'public void setDisplayScreen (HScreen screen) throws SecurityException, Illegal StateException', and this method allows an instance 'HScreen' that is provided as a parameter to be associated with the current logical screen. In this case, the instance 'HScreen' is preferably a display screen.

A parameter of the method 'setDisplayScreen(HScreen screen)' may include a value of 'NULL'. In this case, when the method 'setDisplayScreen(HScreen screen)' is executed without exception handling, the current logical screen is no longer associated with the display screen.

The execution of the methods 'SecurityException' and 'IllegalStateException' may be conducted as an exceptional operation for the method 'setDisplayScreen(HScreen screen)'.

The method 'IllegalStateException' may be executed when a current screen is a logical screen or when a portion of a display screen associated with a current logical screen cannot change due to the characteristics of a host platform.

In operation S1340, areas on the display screen to which the logical screens are to be respectively mapped are determined. At this time, a predetermined method provided by the multiscreen context module 1230 can be called to determine an area on the display screen where the logical screens are to be displayed.

Figure 15:
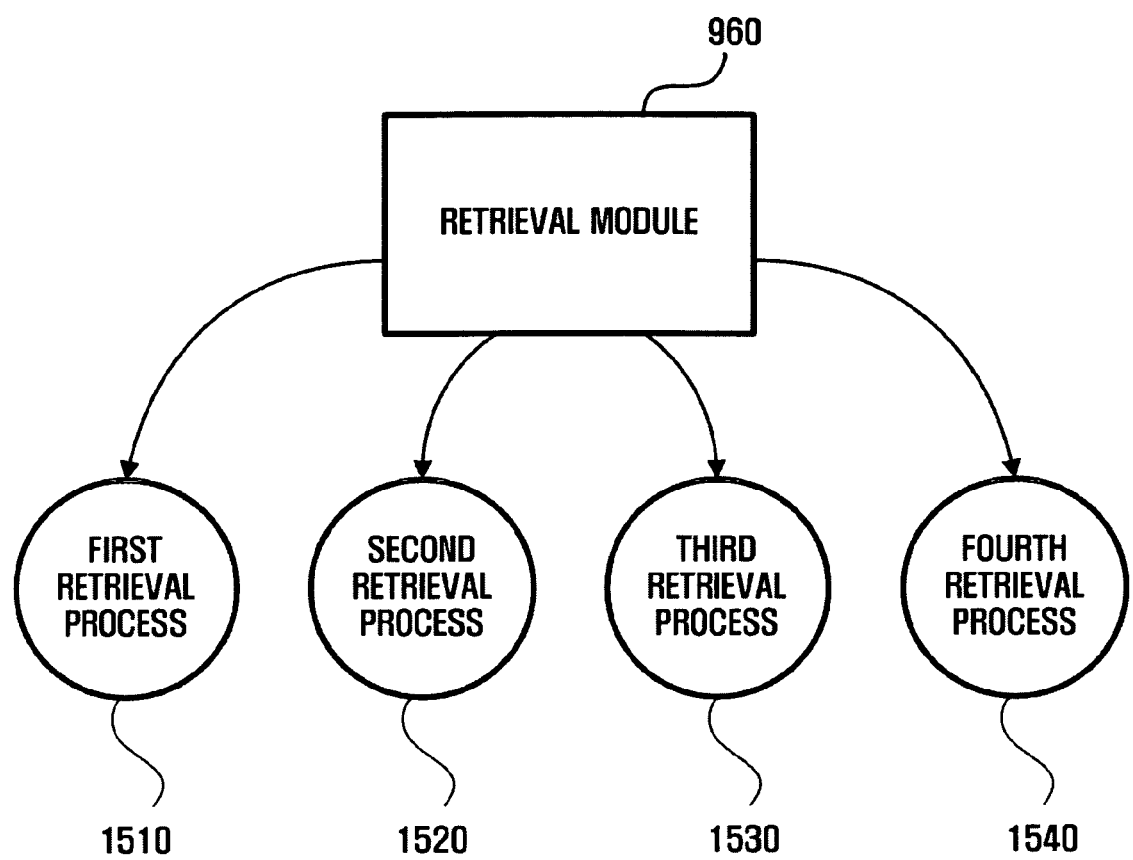
FIG. 15 is a diagram illustrating an operation of a retrieval module according to an exemplary embodiment of the present invention.

FIG. 15 is a diagram illustrating an operation of a retrieval module 960 according to an exemplary embodiment of the present invention, and the retrieval module 960 performs the first to fourth retrieval processes 1510, 1520, 1503, and 1540.

In order to perform the first retrieval process 1510, the retrieval module 960 may call a method 'getScreenConfiguration'. The method 'getScreenConfiguration' returns an instance for a setting type of the current active screen, and is supplied by a class 'MultiScreenConfiguration'.

For example, the method 'getScreenConfiguration' can be represented by a format 'publicMultiScreenConfiguration getScreenConfiguration( ) throws java.lang.SecurityException', and this method returns 'MultiScreenConfiguration' that is an instance for a setting type of the current active screen.

An Exception 'SecurityException' can be performed when the call of the method 'getScreenConfiguration' is not permitted'.

Further, in order to confirm the specific setting type of the screen, the retrieval module 960 may call the method 'getScreenConfigurationType'. The method 'getScreenConfigurationType' returns the setting type of the current active screen, and is supplied by an interface 'MultiScreenConfiguration'.

For example, the method 'getScreenConfigurationType' may be represented by a format 'public MultiScreenConfiguration getScreenConfiguration( ) throws java.lang.SecurityException, and return MultiScreenConfiguration that is an instance for the setting type of the current active screen.

The exception 'SecurityException' can be performed when a call for a method 'getScreenCofiguration' is not permitted.

Further, in order to confirm the specific setting type of the screen, the retrieval module 960 can call the method 'getGreenConfigrrationType'. In this case, the method 'getScreenConfigurationType' returns the setting type of the current active screen, and is provided by an interface 'MultiScreenConfigration'

According to another example, the method 'getScreenConfigurationType' may be represented by a format 'int getScreenConfigurationType( ) {return SCREEN_CONFIGURATION_NON_PIP, SCREEN_CONFIGURATION_NON_PIP_WITH_OVERLAY, SCREEN_CONFIGURATION_PIP, SCREEN_CONFIGURATION_PIP_WITH_OVERLAY, SCREEN_CONFIGURATION_POP, SCREEN_CONFIGURATION_POP_WITH_OVERLAY, SCREEN_CONFIGURATION_GENERAL}, and this method returns the setting type of the current active screen to an integer that is a data type of this method. The above format corresponds to a single screen type, an overlay screen type, a PiP screen type, an overlay PiP screen type, a PoP screen type, an overlay PoP screen type, and a general screen type.

FIG. 16A is a diagram illustrating a code for retrieving a setting type of the screen, and the code is for retrieving whether the setting type of the current active screen is PiP or POP. When the code is SCREEN_CONFIGURATION_PIP and SCREEN_CONFIGURATION_PIP_WITH_OVERLAY, the retrieval module 960 regards the setting type as a PiP type, and when the code is SCREEN_CONFIGURATION_POP and SCREEN_CONFIGURATION_POP_WITH_OVERLAY, the retrieval module 960 regards the setting type as a PoP type, otherwise, he retrieval module 960 regards the setting type as neither a PoP type nor a PiP type.

In order to perform a second retrieval process, the retrieval module 960 may call a method 'getScreens'. The method 'getScreens' returns all of screens generated in the device, and the data format is a class 'HScreen' of a package 'org.havi.ui'. That is, the method 'getScreens' returns all of Hscreen instances generated in the device.

FIG. 16B is a diagram illustrating a code for retrieving instances of all of the screens generated in the device, the code retrieves the setting type of the screen using a retrieved instance. That is, an instance 'screen' of accessible screen that is returned by the method 'getScreens' is extracted, and then the setting types of the respective screens are sequentially retrieved.

In order to perform a third retrieval process, the retrieval module 960 calls a method 'org.havi.ui.HScreen.getDefaultHScreen'. The method 'getDefaultHScreen' is used to retrieve a single screen. When a default screen of the application is defined as a screen to which the application belongs, the application confirms a screen to which the application belongs using a 'getDefaultHScreen' API.

In order to retrieve the display screen mapped to the logical screen, the retrieval module 960 can call the method 'getDisplayScreen'. The method 'getDisplayScreen' returns a display screen connected to the logical screen, the data format is a class 'HScreen' and is provided by an interface 'MultiScreenContext'.

If the called 'HScreen' is a display screen, the method 'getDisplayScreen' returns a reference address for the display screen. If the called 'HScreen' is a logical screen and the logical screen is connected to the display screen, the method returns a reference address of the display screen. Meanwhile, if the called 'HScreen' is a logical screen but is not associated with a display screen, the method 'getDisplayScreen' returns a value 'NULL'.

FIG. 16C is a diagram illustrating a code for retrieving a screen to which an application belongs, the code retrieves a display screen after determining whether the screen to which the application belongs is a logical screen or a display screen.

A default screen 'screen' is extracted using the method 'getDefaultHscreen', and is applied to a method 'getScreenType', thereby confirming whether the screen is a logical screen or a display screen. And then, the method 'getDisplayScreen' returns the display screen on the basis of the result.

In order to perform a fourth retrieval process, the retrieval method 960 calls the method 'getScreenType', a method 'getDisplayArea', a method 'getZOrder', and a method 'getServiceContexts'. The method 'getScreenType' retrieves whether the screen is a logical screen or a display screen, the data format is an integer, and returns a value 'SCREEN_TYPE_DISPLAY' or 'SCREEN_TYPE_LOGICAL'.

The value 'SCREEN_TYPE_DISPLAY' indicates a display screen. When the 'HScreen' is connected to 'VideoOutputPort' and is mapped to a video raster generated by the 'VideoOutputPort, the format of the 'HScreen' becomes 'SCREEN_TYPE_DISPLAY'. In this case, the 'HScreen' is referred to display 'HScreen'.

Further, the value 'SCREEN_TYPE_LOGICAL' indicates a logical screen. When the 'HScreen' is not connected to 'VideoOutputPort' and is mapped to a sub-region of the video raster generated by the 'VideoOutputPort, the format of the 'HScreen' becomes 'SCREEN_TYPE_LOGICAL'. In this case, the 'HScreen' is referred to logical 'HScreen'.

The logical 'HScreen' may be connected to the display 'HScreen'. When the logical 'HScreen' is not connected to the display 'HScreen', a visible and audible service may not be generated by a 'ServiceContext' connected to the logical 'HScreen'.

FIG. 16D is a diagram illustrating a code for retrieving a type of a screen to which an application belongs, the code retrieves whether the screen is a logical screen or a display screen using a method 'getScreenType'.

In order to retrieve a coordinate and z-order of an application disposed on the display screen, a method 'getDisplayArea' and a method 'getZOrder' can be called.

The method 'getDisplayArea' returns the coordinate of the logical screen mapped to the display screen, and the data type is a class 'org.havi.ui.HScreenRectangle'. The method 'getDisplayArea' returns an extend of 'HScreen'. If the type of 'HScreen' is 'SCREEN_TYPE_DISPLAY', the method returns 'HScreenRectangle(0,0,1,1). If the type of 'HScreen' is 'SCREEN_TYPE_LOGICAL' and the 'HScreen' is connected to the output 'HScreen', the method returns an area allocated to the logical 'HScreen'. Further, the type of 'HScreen' is 'SCREEN_TYPE_LOGICAL' and the 'HScreen' is not connected to the output 'HScreen', the method returns a value of 'NULL'.

FIG. 16E is a diagram illustrating a code for retrieving a position on the display screen and the size of a logical screen to which an application belongs, the code retrieves the position and the size of the screen using the method 'getDisplayArea'.

The method 'getDisplayArea' returns a z-order of the logical mapped to the display screen, and the data type is an integer. If the 'HScreen' is a display 'HScreen', the method 'getZOrder' returns a value 'z-order' of 0. If the 'HScreen' is a logical 'HScreen', the method 'getZOrder' returns a value 'z-order' of 1 or more.

In order to retrieve a service context associated with the screen, the method 'getServiceContexts' can be called.

The method 'getServiceContexts' returns a group of service contexts connected to the 'HScreen', and the data format is a class 'java.tv.service.selection.ServiceContext'.

FIG. 16F is a diagram illustrating a code for retrieving service contexts of a screen to which an application belongs, the code retrieves the service contexts of the screen a method 'getServiceContexts'.

FIG. 17 is a flowchart illustrating a process of exchanging services displayed on the logical screens by individual modules shown in FIG. 3 according to an exemplary embodiment of the present invention.

In operation S1410, the multiscreen manager module 1210 temporarily terminates a service to be exchanged between two logical screens.

Thereafter, in operation S1420, information regarding the service is exchanged between the two logical screens. At this time, a method 'removeServiceContext' and a method 'addServiceContext' are called for each of the two logical screens, thereby exchanging service contexts set in the two logical screens between the two logical screens. The method 'removeContext' removes a service context connected to a logical screen, and the method 'addServiceContext' adds a new service context to a logical screen. The methods 'removeServiceContext' and 'addServiceContext' may be provided by the multiscreen context module 1230. According to the current exemplary embodiment of the present invention, service information regarding a service connected to logical services is exchanged between the logical services, thereby obtaining the effect of exchanging a main screen and a sub-screen. In addition, according to the current exemplary embodiment of the present invention, even when three or more services are performed on a display screen, they can be exchanged between an arbitrary number of logical screens.

In operation S1430, occurrence of an event in which the connection between the service and the two logical screens has been changed is generated. Thereafter, in operation S1440, the multiscreen context event module 1240 transmits the event to the multiscreen context listener module 1250, and a service newly connected to the two logical screens begins to be performed.

According to the present invention, it is possible to dynamically configure a plurality of screens that provides a plurality of contents on a physical display device by retrieving the type of the screens in the system and connection relationship there between.

While the present invention has been particularly illustrated and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. An apparatus for providing multiple screens, the apparatus comprising:
    an operation module which generates at least one of screens for displaying a service which is received; and
    a retrieval module which retrieves setting types of the screens and retrieves a screen on which an application included in the service is executed among the screens based on the setting types of the screens among the attribute information of the screens,
    wherein the service is received via a broadcast transmission and restored by a digital signal processing module,
    wherein the service is a group of service components including a video component, an audio component, and a data component, the data component being the application, and
    wherein the plurality of logical screens and the display screen are categorized based on type information among attribute information of the plurality of logical screens and the display screen.

2. The apparatus of claim 1, wherein the screen comprises a picture-in-picture screen.

3. The apparatus of claim 1, wherein the screen comprises a picture-on-picture screen.

4. The apparatus of claim 1, wherein the setting type among the attribute information of the screens comprises at least one of:
    a single screen type in which the screen on which an application is executed corresponds to a display screen;
    an overlay screen type in which the single screen coexists with at least one of overlay screens;
    a picture-in-picture (PiP) screen type in which the screen on which an application is executed corresponds to a logical screen that is mapped to an entire area of the display screen, and at least one of non-overlay logical screens that is mapped to the display screen, but does not correspond to an overlay screen;
    an overlay PiP screen type in which the PiP screen coexists with at least one of overlay screens;
    a picture-on-picture (PoP) screen type in which the screen on which an application is executed corresponds to a combination of at least two non-overlay logical screens that are mapped to an entire area of the display screen, but does not correspond to an overlay screen;

an overlay PoP screen type in which the PoP screen coexists with at least one of overlay screens; and a general screen type.

5. The apparatus of claim 1, wherein the operation module maps a logical screen on which the application is executed to a display screen.

6. The apparatus of claim 1, wherein the operation module executes the application on a display screen.

7. An apparatus for providing multiple screens, the apparatus comprising:

an operation module which generates logical screens for displaying a service which is received and a display screen to which the logical screens are mapped; and a retrieval module which retrieves setting types of the multiple screens, and retrieves all of the logical screens and the display screen based on the setting types of the multiple screens among the attribute information of the screens, wherein service is received via a broadcast transmission and restored by a digital signal processing module, wherein the service is a group of service components including a video component, an audio component, and a data component, the data component being an application, and wherein the plurality of logical screens and the display screen are categorized based on type information among attribute information of the plurality of logical screens and the display screen.

8. The apparatus of claim 7, the retrieval module retrieves only a logical screen and a display screen that is included in an authority range of an application in the service.

9. The apparatus of claim 7, wherein the logical screen comprises a picture-in-picture screen.

10. The apparatus of claim 7, wherein the logical screen comprises a picture-on-picture screen.

11. An apparatus for providing multiple screens, the apparatus comprising:

an operation module which generates logical screens for displaying a service which is received and a display screen to which the logical screens are mapped; and a retrieval module which retrieves setting types of the multiple screens, and retrieves the logical screens and the display screen based on the setting types of the multiple screens among the attribute information of the screens, wherein service is received via a broadcast transmission and restored by a digital signal processing module, wherein the service is a group of service components including a video component, an audio component, and a data component, the data component being an application, and wherein the plurality of logical screens and the display screen are categorized based on type information among attribute information of the plurality of logical screens and the display screen.

12. The apparatus of claim 11, wherein one of the logical screens comprises a picture-in-picture screen.

13. The apparatus of claim 11, wherein one of the logical screens comprises a picture-on-picture screen.

14. An apparatus for providing multiple screens, the apparatus comprising:

a broadcast signal receiving module which receives a service;

an operation module which generates logical screens and a display screen to which the logical screens are mapped; and a retrieval module which retrieves setting types of the multiple screens, and retrieves whether a screen displaying the service is a logical screen or the display screen based on the setting types of the multiple screens among the attribute information of the screens, wherein service is received via a broadcast transmission and restored by a digital signal processing module, wherein the service is a group of service components including a video component, an audio component, and a data component, the data component being an application, and wherein the plurality of logical screens and the display screen are categorized based on type information among attribute information of the plurality of logical screens and the display screen.

15. The apparatus of claim 14, wherein if the screen displaying the service is the logical screen, the operation module retrieves a position on the display screen, a size of the logical screen, and an overlaying relationship between the logical screen and another logical screen on the display screen based on attribute information of the logical screen and the display screen.

16. The apparatus of claim 14, wherein the operation module retrieves a service context for the screen displaying the service based on attribute information of the logical screen and the display screen.

17. A method of dynamically configuring multiple screens, the method comprising:

generating at least one of screens for displaying a received service;

retrieving setting types of the screens; and retrieving a screen on which an application included in the service is executed among the screens based on the setting types of the screens among the attribute information of the screens, wherein the service is received via a broadcast transmission and restored by a digital signal processing module, wherein the service is a group of service components including a video component, an audio component, and a data component, the data component being the application, and wherein the plurality of logical screens and the display screen are categorized based on type information among attribute information of the plurality of logical screens and the display screen.

18. The method of claim 17, wherein the screen comprises a picture-in-picture screen.

19. The method of claim 17, wherein the setting type among the attribute information of the screens comprises at least one of:

a single screen type in which the screen on which an application is executed corresponds to a display screen;

an overlay screen type in which the single screen coexists with at least one of overlay screens;

a picture-in-picture (PiP) screen type in which the screen on which an application is executed corresponds to a logical screen that is mapped to an entire area of the display screen, and at least one of non-overlay logical screens that is mapped to the display screen, but does not correspond to an overlay screen;

an overlay PiP screen type in which the PiP screen coexists with at least one of overlay screens;

a picture-on-picture (PoP) screen type in which the screen on which an application is executed corresponds to a combination of at least two non-overlay logical screens that are mapped to an entire area of the display screen, but does not correspond to an overlay screen;

an overlay PoP screen type in which the PoP screen coexists with at least one of overlay screens; and
a general screen type.

20. The method of claim 17, further comprising mapping a logical screen on which the application is executed to a display screen.

21. The method of claim 17, further comprising executing the application on a display screen.

22. A method of dynamically configuring multiple screens, the method comprising:
generating logical screens for displaying a received service;
generating a display screen to which the logical screens are mapped;
retrieving setting types of the multiple screens; and
retrieving all of the logical screens and the display screen based on the setting types of the multiple screens among the attribute information of the screens,
wherein the service is received via a broadcast transmission and restored by a digital signal processing module,
wherein the service is a group of service components including a video component, an audio component, and a data component, the data component being an application, and
wherein the plurality of logical screens and the display screen are categorized based on type information among attribute information of the plurality of logical screens and the display screen.

23. The method of claim 22, wherein the retrieving comprises retrieving only a logical screen and a display screen that is included in an authority range of an application in the service.

24. The method of claim 22, wherein one of logical screens comprises a picture-in-picture screen.

25. The method of claim 22, wherein one of the logical screens comprises a picture-on-picture screen.

26. A method of dynamically configuring multiple screens, the method comprising:
generating logical screens for displaying a received service;
generating a display screen to which the logical screens are mapped;
retrieving setting types of the multiple screens among the attribute information of the logical screens and the display screen; and
retrieving the logical screens and the display screen based on the setting types of the multiple screens,
wherein the service is received via a broadcast transmission and restored by a digital signal processing module,
wherein the service is a group of service components including a video component, an audio component, and a data component, the data component being an application, and
wherein the plurality of logical screens and the display screen are categorized based on type information among attribute information of the plurality of logical screens and the display screen.

27. The method of claim 26, wherein one of the logical screens comprises a picture-in-picture screen.

28. The method of claim 26, wherein one of the logical screens comprises a picture-on-picture screen.

29. A method of dynamically configuring multiple screens, the method comprising:
receiving a service;
generating logical screens;
generating a display screen to which the logical screens are mapped;
retrieving setting types of the multiple screens among the attribute information of the logical screens and the display screen; and
retrieving whether a screen displaying the service is a logical screen or the display screen based on the setting types of the multiple screens,
wherein service is received via a broadcast transmission and restored by a digital signal processing module,
wherein the service is a group of service components including a video component, an audio component, and a data component, the data component being an application, and
wherein the plurality of logical screens and the display screen are categorized based on type information among attribute information of the plurality of logical screens and the display screen.

30. The method of claim 29, wherein the retrieving comprises retrieving a position on the display screen, a size of the logical screen, and an overlaying relationship between the logical screen and another logical screen on the display screen if the screen displaying the service is the logical screen based on attribute information of the logical screen and the display screen.

31. The method of claim 29, wherein the retrieving comprises retrieving a service context for the screen displaying the service based on attribute information of the logical screen and the display screen.

32. A system capable of configuring a plurality of screens in a physical display device, the system comprising:
an operation module which generates a plurality of logical screens to display a plurality of services that are requested and a display screen to which the plurality of logical screens are mapped; and
a retrieval module which retrieves setting types of the screens among the attribute information of the logical screens and the display screen and performs a screen retrieval process to retrieve the screens from the operation module based on the setting types of the screens, wherein the screen retrieval process comprises at least one of:
(a) retrieving a setting type of a screen on which an application included in the requested services is being executed, the screen setting type comprising at least one of a single screen, an overlay screen, a Picture-in-Picture (PiP) screen, an overlay PiP screen, a Picture-outside-Picture (PoP) screen, an overlay PoP screen, and a general screen,
(b) retrieving only those of the logical screens and the display screen that are included in an authority range of received applications
(c) retrieving all of the logical screens and the mapped display screen, and
(d) when a screen on which an application is being executed is a logical screen, retrieving a position and a size of the executing logical screen on the display screen, a z-order of the executing logical screen respect to another logical screen on the display screen, and a service context of a retrieved screen,
wherein each of the plurality of services is received via a broadcast transmission and restored by a digital signal processing module,
wherein each of the plurality of services is a group of service components including a video component, an audio component, and a data component, the data component being the application, and wherein the plurality of logical screens and the display screen are categorized based on type information among attribute information of the plurality of logical screens and the display screen.

33. The method of claim 17, wherein the screen comprises a picture-on-picture screen.

* * * * *